United States Patent
Potapenko et al.

(10) Patent No.: US 9,523,268 B2
(45) Date of Patent: Dec. 20, 2016

(54) IN SITU CHANNELIZATION METHOD AND SYSTEM FOR INCREASING FRACTURE CONDUCTIVITY

(71) Applicant: Schlumberger Technology Corporation, Sugar Land, TX (US)

(72) Inventors: Dmitriy Ivanovich Potapenko, Novosibirsk (RU); J. Ernest Brown, Sugar Land, TX (US); Partha Ganguly, Sugar Land, TX (US); Andrey Bogdan, Sugar Land, TX (US); Leland Ramsey, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 205 days.

(21) Appl. No.: 13/974,203

(22) Filed: Aug. 23, 2013

(65) Prior Publication Data

US 2015/0053403 A1  Feb. 26, 2015

(51) Int. Cl.
E21B 43/26 (2006.01)
C09K 8/62 (2006.01)
C09K 8/80 (2006.01)
E21B 43/267 (2006.01)

(52) U.S. Cl.
CPC ............ *E21B 43/267* (2013.01); *C09K 8/62* (2013.01); *C09K 8/80* (2013.01)

(58) Field of Classification Search
CPC ........... E21B 43/267; C09K 8/62; C09K 8/80
See application file for complete search history.

(56) References Cited

U.S. PATENT DOCUMENTS

| | | |
|---|---|---|
| 5,518,996 A | 5/1996 | Maroy et al. |
| 5,905,468 A | 5/1999 | Ikawa et al. |
| 6,059,034 A * | 5/2000 | Rickards et al. ......... 166/280.2 |
| 6,599,863 B1 | 7/2003 | Palmer et al. |
| 6,776,235 B1 * | 8/2004 | England ............... E21B 43/267 166/271 |
| 6,820,694 B2 | 11/2004 | Willberg et al. |
| 7,275,596 B2 | 10/2007 | Willberg et al. |
| 7,380,601 B2 | 6/2008 | Willberg et al. |
| 7,581,590 B2 * | 9/2009 | Lesko et al. ............... 166/280.1 |
| 7,665,522 B2 | 2/2010 | Sullivan et al. |

(Continued)

FOREIGN PATENT DOCUMENTS

| | | |
|---|---|---|
| EP | 1298280 A1 | 4/2003 |
| WO | 2008068645 A1 | 6/2008 |

(Continued)

OTHER PUBLICATIONS

U.S. Appl. No. 13/415,025 (not yet published), filed Mar. 8, 2012.

(Continued)

*Primary Examiner* — Zakiya W Bates
*Assistant Examiner* — Crystal J Miller
(74) *Attorney, Agent, or Firm* — Andrea E. Tran; Tim Curington

(57) ABSTRACT

A method and system for increasing fracture conductivity. A treatment slurry stage has a continuous first solid particulate concentration and a discontinuous anchorant concentration between anchorant-rich substages and anchorant-lean substages within the treatment slurry stage.

29 Claims, 7 Drawing Sheets

(56) References Cited

U.S. PATENT DOCUMENTS

| | | |
|---|---|---|
| 7,784,541 B2 | 8/2010 | Hartman et al. |
| 7,789,146 B2 | 9/2010 | Panga et al. |
| 7,798,224 B2 | 9/2010 | Huang et al. |
| 7,833,950 B2 | 11/2010 | Willberg et al. |
| 7,931,089 B2 | 4/2011 | Miller et al. |
| 8,008,234 B2 | 8/2011 | Panga et al. |
| 8,042,614 B2 | 10/2011 | Sullivan et al. |
| 8,119,574 B2 | 2/2012 | Panga et al. |
| 8,210,249 B2 | 7/2012 | Panga et al. |
| 8,227,026 B2 | 7/2012 | McDaniel et al. |
| 8,230,925 B2 | 7/2012 | Willberg et al. |
| 8,234,072 B2 | 7/2012 | Smith, Jr. et al. |
| 8,372,787 B2 | 2/2013 | Droger |
| 2003/0062167 A1 | 4/2003 | Surjaatmadja et al. |
| 2004/0261999 A1 | 12/2004 | Nguyen |
| 2005/0178553 A1 | 8/2005 | Harris |
| 2006/0157243 A1* | 7/2006 | Nguyen ............... C09K 8/805 166/280.2 |
| 2008/0135242 A1* | 6/2008 | Lesko ............... C09K 8/665 166/268 |
| 2008/0196896 A1 | 8/2008 | Bustos et al. |
| 2009/0025934 A1 | 1/2009 | Hartman et al. |
| 2010/0300688 A1 | 12/2010 | Panga et al. |
| 2011/0098202 A1 | 4/2011 | James et al. |
| 2011/0114313 A1* | 5/2011 | Lesko et al. ............ 166/280.1 |
| 2012/0000641 A1 | 1/2012 | Panga et al. |
| 2012/0111563 A1 | 5/2012 | Abad et al. |
| 2012/0132421 A1 | 5/2012 | Loiseau et al. |
| 2012/0138296 A1 | 6/2012 | Panga et al. |
| 2012/0247764 A1* | 10/2012 | Panga et al. ............ 166/280.2 |
| 2012/0305245 A1 | 12/2012 | Loiseau et al. |
| 2012/0305254 A1 | 12/2012 | Chen et al. |
| 2014/0131040 A9* | 5/2014 | Panga et al. ............ 166/280.2 |

FOREIGN PATENT DOCUMENTS

| | | |
|---|---|---|
| WO | WO2011050046 | 4/2011 |
| WO | WO2012054456 | 4/2012 |
| WO | WO2013085412 | 6/2013 |

OTHER PUBLICATIONS

U.S. Appl. No. 13/832,938 (not yet published), filed Mar. 15, 2013.
Potapenko et al., "Shale Refracture Stimulations Using a Novel Diversion Technique," SPE 119636, 2009.
Taylor, G., "The Dispersion of Matter in Turbulent Flow Through a Pipe," Proceedings of the Royal Society, vol. 223, 1954, pp. 446-468.
Taylor, G., "Dispersion of Soluble Material in Solvent Flowing Slowly Through a Tube," Proceedings of the Royal Society, vol. 219, pp. 186-203.
International Search Report and Written Opinion issued in PCT/US2014/050468 on Nov. 27, 2014, 16 pages.

* cited by examiner

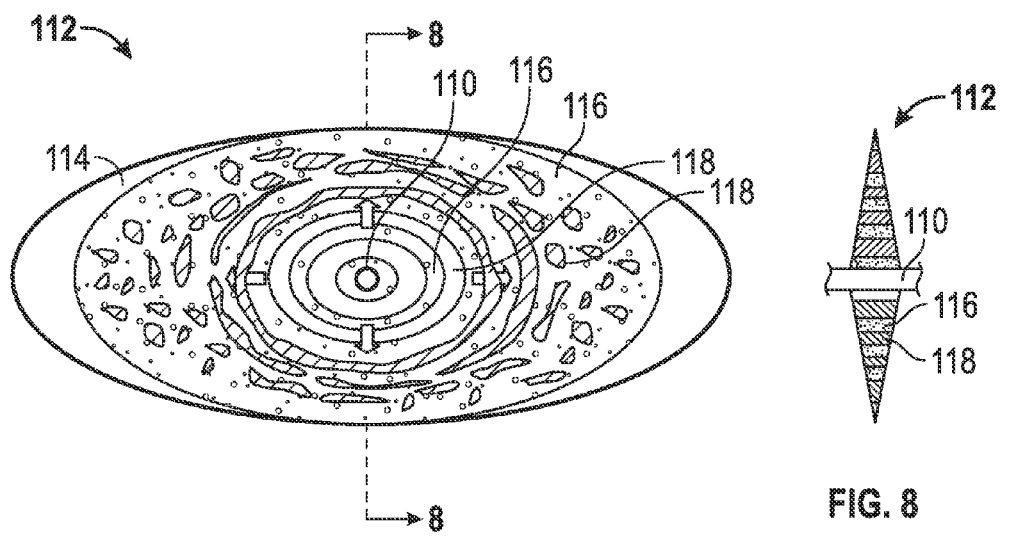
FIG. 7
FIG. 8
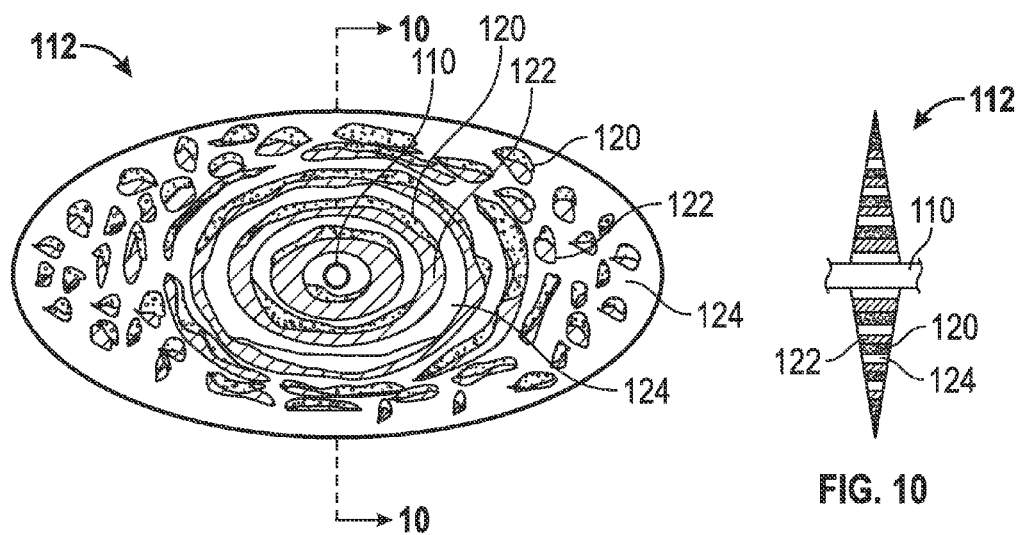
FIG. 9
FIG. 10

IN SITU CHANNELIZATION METHOD AND SYSTEM FOR INCREASING FRACTURE CONDUCTIVITY

RELATED APPLICATION DATA

None.

BACKGROUND

The statements in this section merely provide background information related to the present disclosure and may not constitute prior art.

Fracturing is used to create conductive pathways in a subterranean formation and increase fluid flow between the formation and the wellbore. A fracturing fluid is injected into the wellbore passing through the subterranean formation. A propping agent (proppant) is injected into the fracture to prevent fracture closure and, thereby, to provide improved extraction of extractive fluids, such as oil, gas or water.

The proppant maintains the distance between the fracture walls in order to create conductive channels in the formation. The pulsed injection of alternating proppant-free and fiber-stabilized, proppant-laden slugs into the fracture has been used to obtain a heterogeneous distribution of proppant particles into a channels and pillars configuration, which can improve the conductivity in the fracture. Accordingly, there is a demand for further improvements in this area of technology.

SUMMARY

In some embodiments according to the disclosure herein, an in situ method and system are provided for increasing fracture conductivity. In embodiments, a treatment slurry stage has a continuous first solid particulate concentration and a discontinuous concentration of an additive that facilitates clustering of the first solid particulate in the fracture, anchoring of the clusters in the fracture, or a combination thereof, to form anchored clusters of the first solid particulate to prop open the fracture upon closure and provide hydraulic conductivity through the fracture following closure, such as, for example, by forming interconnected, hydraulically conductive channels between the clusters.

In embodiments, a method for treating a subterranean formation penetrated by a wellbore comprises: injecting a treatment stage fluid above a fracturing pressure to form a fracture in the formation; continuously distributing a first solid particulate into the formation in the treatment stage fluid; aggregating the first solid particulate distributed into the fracture to form spaced-apart clusters in the fracture; anchoring the clusters in the fracture to inhibit aggregation of the clusters; reducing pressure in the fracture to prop the fracture open on the clusters and form interconnected, hydraulically conductive channels between the clusters.

In some embodiments, a method for treating a subterranean formation penetrated by a wellbore comprises: injecting into a fracture in the formation at a continuous rate a treatment fluid stage with a continuous first solid particulate concentration; while maintaining the continuous rate and first solid particle concentration during injection of the treatment fluid stage, successively alternating concentration modes of an anchorant in the treatment fluid stage between a plurality of relatively anchorant-rich modes and a plurality of anchorant-lean modes within the injected treatment fluid stage.

In some embodiments, a method for treating a subterranean formation penetrated by a wellbore comprises: injecting into a fracture in the formation at a continuous rate a treatment fluid stage comprising a viscosified carrier fluid with a continuous first solid particulate concentration to form a homogenous region within the fracture of continuously uniform distribution of the first solid particulate; successively alternating concentration modes of an anchorant in the treatment fluid between relatively anchorant-rich modes and relatively anchorant-lean modes within the injected treatment fluid stage, to form heterogeneous areas comprising anchorant-rich areas and anchorant-lean areas within the homogenous region of the continuously uniform distribution of the first solid particulate; reducing the viscosity of the carrier fluid within the homogenous region to induce settling of the first solid particulate prior to closure of the fracture to form hydraulically conductive channels in at least the anchorant-lean areas and to form pillars in the anchorant-rich areas; and thereafter allowing the fracture to close onto the pillars. In some embodiments, hydraulically conductive channels may also be formed in or through the anchorant-rich areas and/or the pillars, e.g., as disclosed in copending commonly assigned U.S. patent application Ser. No. 13/832,938, which is hereby incorporated herein by reference in its entirety.

In some embodiments, a system to produce reservoir fluids comprises the wellbore and fracture resulting from any of the fracturing methods disclosed herein.

In embodiments, a system comprises: a subterranean formation penetrated by a wellbore; a treatment slurry stage disposed in the wellbore, the treatment slurry stage comprising a continuous first solid particulate concentration, and a plurality of relatively anchorant-rich substages disposed in an alternating sequence in the wellbore with a plurality of anchorant-lean substages; and a pump system to continuously deliver the treatment fluid stage from the wellbore to the formation at a pressure above fracturing pressure to inject the treatment fluid stage into a fracture in the formation.

In some embodiments, a system to treat a subterranean formation penetrated by a wellbore comprises: a pump system to deliver a treatment stage fluid through the wellbore to the formation above a fracturing pressure to form a fracture in the formation; a treatment stage fluid supply unit to continuously distribute a first solid particulate into the treatment stage fluid, and to introduce an anchorant into the treatment stage fluid in successively alternating concentrations between a relatively anchorant-rich mode and an anchorant-lean mode, to form the treatment stage fluid having a continuous first solid particulate concentration and bimodal anchorant concentration; a trigger in the treatment stage fluid to initiate aggregation of the first solid particulate in the fracture to form spaced-apart clusters in the fracture; an anchoring system in the treatment fluid stage to anchor the clusters in the fracture and inhibit settling or aggregation of the clusters; and a shut-in system to maintain and then reduce pressure in the fracture to prop the fracture open on the clusters and form interconnected, hydraulically conductive channels between the clusters.

In embodiments, a system to treat a subterranean formation penetrated by a wellbore comprises: means for injecting a treatment stage fluid above a fracturing pressure to form a fracture in the formation; means for continuously distributing a first solid particulate into the formation in the treatment stage fluid; means for aggregating the first solid particulate distributed into the fracture to form spaced-apart clusters in the fracture; means for anchoring the clusters in the fracture to inhibit settling or aggregation of the clusters; means for reducing pressure in the fracture to prop the fracture open on the clusters and form interconnected, hydraulically conductive channels between the clusters.

BRIEF DESCRIPTION OF THE DRAWINGS

These and other features and advantages will be better understood by reference to the following detailed description when considered in conjunction with the accompanying drawings.

FIG. 7 schematically illustrates the distribution of anchorant lean and anchorant rich regions in the hydraulic fracture from the pumping sequence of FIG. 5 before proppant settling according to some embodiments of the current application.

FIG. 8 is a side sectional view of fracture of FIG. 7 as seen along the lines 8-8.

FIG. 9 schematically illustrates the formation of solids rich clusters and solids lean areas corresponding to conductive channels during proppant settling from the anchorant distribution of FIGS. 7-8 according to some embodiments of the current application.

FIG. 10 is a side sectional view of fracture of FIG. 9 as seen along the lines 10-10.

DETAILED DESCRIPTION OF SOME ILLUSTRATIVE EMBODIMENTS

Figure 1:
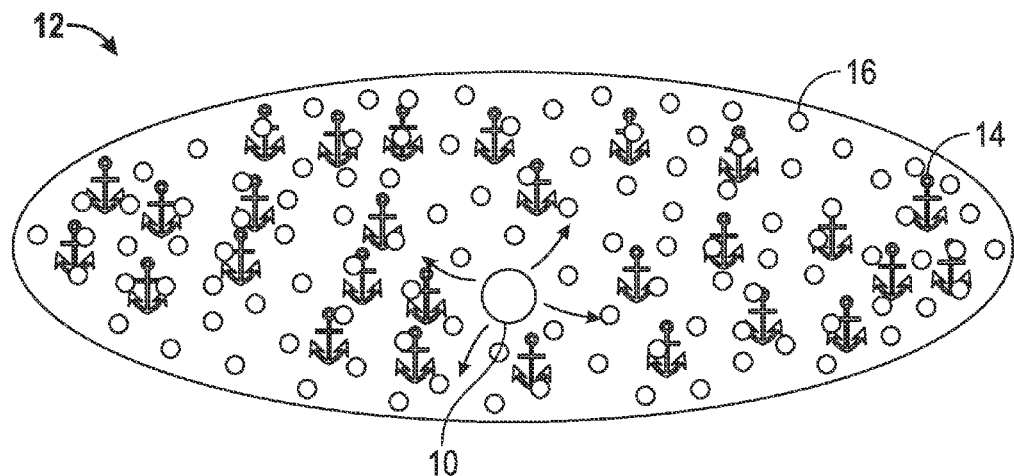
FIG. 1 is a schematic diagram of a fracture being filled with proppant and an anchor-forming material according to some embodiments of the current application.

For the purposes of promoting an understanding of the principles of the disclosure, reference will now be made to some illustrative embodiments of the current application. Like reference numerals used herein refer to like parts in the various drawings. Reference numerals without suffixed letters refer to the part(s) in general; reference numerals with suffixed letters refer to a specific one of the parts.

As used herein, "embodiments" refers to non-limiting examples of the application disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

Moreover, the schematic illustrations and descriptions provided herein are understood to be examples only, and components and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

It should be understood that, although a substantial portion of the following detailed description may be provided in the context of oilfield hydraulic fracturing operations, other oilfield operations such as cementing, gravel packing, etc., or even non-oilfield well treatment operations, can utilize and benefit as well from the instant disclosure.

In some embodiments according to the disclosure herein, an in situ method and system are provided for increasing fracture conductivity. By "in situ" is meant that channels of relatively high hydraulic conductivity are formed in a fracture after it has been filled with a generally continuous proppant particle concentration. As used herein, a "hydraulically conductive fracture" is one which has a high conductivity relative to the adjacent formation matrix, whereas the term "conductive channel" refers to both open channels as well as channels filled with a matrix having interstitial spaces for permeation of fluids through the channel, such that the channel has a relatively higher conductivity than adjacent non-channel areas.

The term "continuous" in reference to concentration or other parameter as a function of another variable such as time, for example, means that the concentration or other parameter is an uninterrupted or unbroken function, which may include relatively smooth increases and/or decreases with time, e.g., a smooth rate or concentration of proppant particle introduction into a fracture such that the distribution of the proppant particles is free of repeated discontinuities and/or heterogeneities over the extent of proppant particle filling. In some embodiments, a relatively small step change in a function is considered to be continuous where the change is within +/−10% of the initial function value, or within +/−5% of the initial function value, or within +/−2% of the initial function value, or within +/−1% of the initial function value, or the like over a period of time of 1 minute, 10 seconds, 1 second, or 1 millisecond. The term "repeated" herein refers to an event which occurs more than once in a stage.

Conversely, a parameter as a function of another variable such as time, for example, is "discontinuous" wherever it is not continuous, and in some embodiments, a repeated relatively large step function change is considered to be discontinuous, e.g., where the lower one of the parameter values before and after the step change is less than 80%, or less than 50%, or less than 20%, or less than 10%, or less than 5%, or less than 2% or less than 1%, of the higher one of the parameter values before and after the step change over a period of time of 1 minute, 10 seconds, 1 second, or 1 millisecond.

In embodiments, the conductive channels are formed in situ after placement of the proppant particles in the fracture by differential movement of the proppant particles, e.g., by gravitational settling and/or fluid movement such as fluid flow initiated by a flowback operation, out of and/or away from an area(s) corresponding to the conductive channel(s) and into or toward spaced-apart areas in which clustering of the proppant particles results in the formation of relatively less conductive areas, which clusters may correspond to pillars between opposing fracture faces upon closure.

In some embodiments, a treatment slurry stage has a continuous concentration of a first solid particulate, e.g., proppant, and a discontinuous concentration of an additive that facilitates either clustering of the first solid particulate in the fracture, or anchoring of the clusters in the fracture, or a combination thereof, to form anchored clusters of the first solid particulate to prop open the fracture upon closure. As used herein, "anchorant" refers to a material, a precursor material, or a mechanism, that inhibits settling, or preferably stops settling, of particulates or clusters of particulates in a fracture, whereas an "anchor" refers to an anchorant that is active or activated to inhibit or stop the settling. In some embodiments, the anchorant may comprise a material, such as fibers, flocs, flakes, discs, rods, stars, etc., for example, which may be heterogeneously distributed in the fracture and have a different settling rate, and/or cause some of the first solid particulate to have a different settling rate, which may be faster or preferably slower with respect to the first solid particulate and/or clusters. As used herein, the term "flocs" includes both flocculated colloids and colloids capable of forming flocs in the treatment slurry stage.

In some embodiments, the anchorant may adhere to one or both opposing surfaces of the fracture to stop movement of a proppant particle cluster and/or to provide immobilized structures upon which proppant or proppant cluster(s) may accumulate. In some embodiments, the anchors may adhere to each other to facilitate consolidation, stability and/or strength of the formed clusters.

In some embodiments, the anchorant may comprise a continuous concentration of a first anchorant component and a discontinuous concentration of a second anchorant component, e.g., where the first and second anchorant components may react to form the anchor as in a two-reactant system, a catalyst/reactant system, a pH-sensitive reactant/pH modifier system, or the like.

In some embodiments, the anchorant may form lower boundaries for particulate settling.

In some embodiments, a method for treating a subterranean formation penetrated by a wellbore comprises: injecting a treatment stage fluid above a fracturing pressure to form a fracture in the formation; continuously distributing a first solid particulate into the formation in the treatment stage fluid; aggregating the first solid particulate distributed into the fracture to form spaced-apart clusters in the fracture; anchoring at least some of the clusters in the fracture to inhibit aggregation of at least some of the clusters; reducing pressure in the fracture to prop the fracture open on the clusters and form interconnected, hydraulically conductive channels between the clusters.

In some embodiments, the first solid particulate continuously distributed in the treatment stage fluid comprises disaggregated proppant at a continuous concentration. In some embodiments, the aggregation comprises triggering settling of the distributed first solid particulate. In some embodiments, the method further comprises viscosifying the treatment stage fluid for distributing the first solid particulate into the formation, and breaking the treatment stage fluid in the fracture to trigger the settling. In some embodiments, the method further comprises successively alternating concentration modes of an anchorant in the treatment stage fluid between a relatively anchorant-rich mode and an anchorant-lean mode during the continuous distribution of the first solid particulate into the formation in the treatment stage fluid to facilitate one or both of the cluster aggregation and anchoring. As used herein, an anchorant is an additive either which induces or facilitates agglomeration of solid particulates into clusters, or which facilitates the activation of anchors, as defined above, or both. In some embodiments, the anchorant comprises fibers, flocs, flakes, discs, rods, stars, etc. In some embodiments, the anchorant-lean concentration mode is free or essentially free of anchorant, or a difference between the concentrations of the anchorant-rich and anchorant-lean modes is at least 10, or at least 25, or at least 40, or at least 50, or at least 60, or at least 75, or at least 80, or at least 90, or at least 95, or at least 98, or at least 99, or at least 99.5 weight percent of the anchorant concentration of the anchorant-rich mode. An anchorant-lean mode is essentially free of anchorant if the concentration of anchorant is insufficient to form anchors.

In some embodiments, the conductive channels extend in fluid communication from adjacent a face of in the formation away from the wellbore to or to near the wellbore, e.g., to facilitate the passage of fluid between the wellbore and the formation, such as in the production of reservoir fluids and/or the injection of fluids into the formation matrix. As used herein, "near the wellbore" refers to conductive channels coextensive along a majority of a length of the fracture terminating at a permeable matrix between the conductive channels and the wellbore, e.g., where the region of the fracture adjacent the wellbore is filled with a permeable solids pack as in a high conductive proppant tail-in stage, gravel packing or the like.

In some embodiments, a method for treating a subterranean formation penetrated by a wellbore comprises: injecting into a fracture in the formation at a continuous rate a treatment fluid stage with a continuous first solid particulate concentration; while maintaining the continuous rate and first solid particle concentration during injection of the treatment fluid stage, successively alternating concentration modes of an anchorant, such as fiber, in the treatment fluid stage between a plurality of relatively anchorant-rich modes and a plurality of anchorant-lean modes within the injected treatment fluid stage.

In some embodiments, the injection of the treatment fluid stage forms a homogenous region within the fracture of continuously uniform distribution of the first solid particulate. In some embodiments, the alternation of the concentration of the anchorant forms heterogeneous areas within the fracture comprising anchorant-rich areas and anchorant-lean areas.

In some embodiments, the injected treatment fluid stage comprises a viscosified carrier fluid, and the method may further comprise reducing the viscosity of the carrier fluid in the fracture to induce settling of the first solid particulate prior to closure of the fracture, and thereafter allowing the fracture to close.

In some embodiments, the method may also include forming bridges with the anchorant-rich modes in the fracture and forming conductive channels between the bridges with the anchorant-lean modes.

In some embodiments, a method for treating a subterranean formation penetrated by a wellbore comprises: injecting into a fracture in the formation at a continuous rate a treatment fluid stage comprising a viscosified carrier fluid with a continuous first solid particulate concentration to form a homogenous region within the fracture of continuously uniform distribution of the first solid particulate; successively alternating concentration modes of an anchorant in the treatment fluid between relatively anchorant-rich modes and relatively anchorant-lean modes within the injected treatment fluid stage, to form heterogeneous areas comprising anchorant-rich areas and anchorant-lean areas within the homogenous region of the continuously uniform distribution of the first solid particulate; reducing the viscosity of the carrier fluid within the homogenous region to induce settling of the first solid particulate prior to closure of the fracture to form hydraulically conductive channels in at least the anchorant-lean areas and pillars in the anchorant-rich areas; and thereafter allowing the fracture to close onto the pillars.

In some embodiments, the method may include transforming the anchorant-rich areas into nodes rich in the first solid particulate to form the pillars. In some embodiments, the first solid particulate and the anchorant may have different characteristics to impart different settling rates. In some embodiments, the first solid particulate and the anchorant may have different shapes, sizes, densities or a combination thereof. In some embodiments, the anchorant has an aspect ratio, defined as the ratio of the longest dimension of the particle to the shortest dimension of the particle, higher than 6. In some embodiments, the anchorant is a fiber, a floc, a flake, a ribbon, a platelet, a rod, or a combination thereof.

In some embodiments, the anchorant may comprise a degradable material. In some embodiments, the anchorant is selected from the group consisting of polylactic acid (PLA), polyglycolic acid (PGA), polyethylene terephthalate (PET), polyester, polyamide, polycaprolactam and polylactone, poly(butylene Succinate, polydioxanone, glass, ceramics, carbon (including carbon-based compounds), elements in metallic form, metal alloys, wool, basalt, acrylic, polyethylene, polypropylene, novoloid resin, polyphenylene sulfide, polyvinyl chloride, polyvinylidene chloride, polyurethane, polyvinyl alcohol, polybenzimidazole, polyhydroquinone-diimidazopyridine, poly(p-phenylene-2,6-benzobisoxazole), rayon, cotton, or other natural fibers, rubber, sticky fiber, or a combination thereof. In some embodiments the anchorant may comprise acrylic fiber. In some embodiments the anchorant may comprise mica.

In some embodiments, the anchorant is present in the anchorant-laden stages of the treatment slurry in an amount of less than 5 vol %. All individual values and subranges from less than 5 vol % are included and disclosed herein. For example, the amount of anchorant may be from 0.05 vol % less than 5 vol %, or less than 1 vol %, or less than 0.5 vol %. The anchorant may be present in an amount from 0.5 vol % to 1.5 vol %, or in an amount from 0.01 vol % to 0.5 vol %, or in an amount from 0.05 vol % to 0.5 vol %.

In further embodiments, the anchorant may comprise a fiber with a length from 1 to 50 mm, or more specifically from 1 to 10 mm, and a diameter of from 1 to 50 microns, or, more specifically from 1 to 20 microns. All values and subranges from 1 to 50 mm are included and disclosed herein. For example, the fiber agglomerant length may be from a lower limit of 1, 3, 5, 7, 9, 19, 29 or 49 mm to any higher upper limit of 2, 4, 6, 8, 10, 20, 30 or 50 mm. The fiber anchorant length may range from 1 to 50 mm, or from 1 to 10 mm, or from 1 to 7 mm, or from 3 to 10 mm, or from 2 to 8 mm. All values from 1 to 50 microns are included and disclosed herein. For example, the fiber anchorant diameter may be from a lower limit of 1, 4, 8, 12, 16, 20, 30, 40, or 49 microns to an upper limit of 2, 6, 10, 14, 17, 22, 32, 42 or 50 microns. The fiber anchorant diameter may range from 1 to 50 microns, or from 10 to 50 microns, or from 1 to 15 microns, or from 2 to 17 microns.

In further embodiments, the anchorant may be fiber selected from the group consisting of polylactic acid (PLA), polyester, polycaprolactam, polyamide, polyglycolic acid, polyterephthalate, cellulose, wool, basalt, glass, rubber, or a combination thereof.

In further embodiments, the anchorant may comprise a fiber with a length from 0.001 to 1 mm and a diameter of from 50 nanometers (nm) to 10 microns. All individual values from 0.001 to 1 mm are disclosed and included herein. For example, the anchorant fiber length may be from a lower limit of 0.001, 0.01, 0.1 or 0.9 mm to any higher upper limit of 0.009, 0.07, 0.5 or 1 mm. All individual values from 50 nanometers to 10 microns are included and disclosed herein. For example, the fiber anchorant diameter may range from a lower limit of 50, 60, 70, 80, 90, 100, or 500 nanometers to an upper limit of 500 nanometers, 1 micron, or 10 microns.

In some embodiments, the anchorant may comprise an expandable material, such as, for example, swellable elastomers, temperature expandable particles, Examples of oil swellable elastomers include butadiene based polymers and copolymers such as styrene butadiene rubber (SBR), styrene butadiene block copolymers, styrene isoprene copolymer, acrylate elastomers, neoprene elastomers, nitrile elastomers, vinyl acetate copolymers and blends of EV A, and polyurethane elastomers. Examples of water and brine swellable elastomers include maleic acid grafted styrene butadiene elastomers and acrylic acid grafted elastomers. Examples of temperature expandable particles include metals and gas filled particles that expand more when the particles are heated relative to silica sand. In some embodiments, the expandable metals can include a metal oxide of Ca, Mn, Ni, Fe, etc. that reacts with the water to generate a metal hydroxide which has a lower density than the metal oxide, i.e., the metal hydroxide occupies more volume than the metal oxide thereby increasing the volume occupied by the particle. Further examples of swellable inorganic materials can be found in U.S. Application Publication Number US 20110098202, which is hereby incorporated by reference in its entirety. An example for gas filled material is EXPANCEL™ microspheres that are manufactured by and commercially available from Akzo Nobel of Chicago, Ill. These microspheres contain a polymer shell with gas entrapped inside. When these microspheres are heated the gas inside the shell expands and increases the size of the particle. The diameter of the particle can increase 4 times which could result in a volume increase by a factor of 64.

In some embodiments, the treatment fluid stage is a proppant-laden hydraulic fracturing fluid and the solid first particulate is a proppant.

In some embodiments, a system to produce reservoir fluids comprises the wellbore and the fracture resulting from any of the fracturing methods disclosed herein.

In embodiments, a system comprises: a subterranean formation penetrated by a wellbore; a treatment slurry stage disposed in the wellbore, the treatment slurry stage comprising a continuous first solid particulate concentration, and a plurality of relatively anchorant-rich substages disposed in the wellbore in an alternating sequence with a plurality of anchorant-lean substages; and a pump system which may comprise one or more pumps to continuously deliver the treatment fluid stage from the wellbore to the formation at a pressure above fracturing pressure to inject the treatment fluid stage into a fracture in the formation. In some embodiments, the treatment fluid stage comprises a viscosified carrier fluid and a breaker to induce settling of the first solid particulate prior to closure of the fracture. In some embodiments, the system may also include a treatment fluid supply unit to supply additional anchorant-rich and anchorant-lean substages of the treatment fluid stage to the wellbore.

In some embodiments, a system to treat a subterranean formation penetrated by a wellbore comprises: a pump system which may comprise one or more pumps to deliver a treatment stage fluid through the wellbore to the formation above a fracturing pressure to form a fracture in the formation; a treatment stage fluid supply unit to continuously distribute a first solid particulate into the treatment stage fluid, and to introduce an anchorant into the treatment stage fluid in successively alternating concentrations between a relatively anchorant-rich mode and an anchorant-lean mode, to form the treatment stage fluid having a continuous first solid particulate concentration and bimodal (or multimodal) anchorant concentration; a trigger in the treatment stage fluid to initiate aggregation of the first solid particulate in the fracture to form spaced-apart clusters in the fracture; an anchoring system in the treatment fluid stage to anchor the clusters in the fracture and inhibit aggregation of the clusters; and a shut-in system to maintain and then reduce pressure in the fracture to prop the fracture open on the clusters and form interconnected, hydraulically conductive channels between the clusters.

In some embodiments, the initiation of the aggregation of the first solid particulate may comprise gravitational settling of the first solid particulate. In embodiments, the treatment fluid stage may comprise a viscosified carrier fluid, and the trigger may be a breaker.

The following discussion is based on specific examples according to some embodiments wherein the first particulate comprises proppant and the anchorant or anchor, where present, comprises fiber. In some specific embodiments illustrated below, the wellbore is oriented horizontally and the fracture is generally vertical, however, the disclosure herein is not limited to this specific configuration.

In some embodiments, the method comprises pumping a proppant laden fracturing fluid into a subterranean formation at pressure above a fracturing pressure of the formation, wherein the fracturing fluid contains a continuous proppant concentration in alternating stages with and without added fiber. With reference to FIG. 1, in some embodiments a wellbore 10 in communication with a fracture 12 may introduce a fracturing fluid transporting anchorants 14 and proppant 16 into the fracture 12. During the fracturing stage in these embodiments, the fracturing fluid flows radially away from the wellbore 10 to distribute the anchorants 14 and proppant 16 within the fracture 12.

Figure 2:
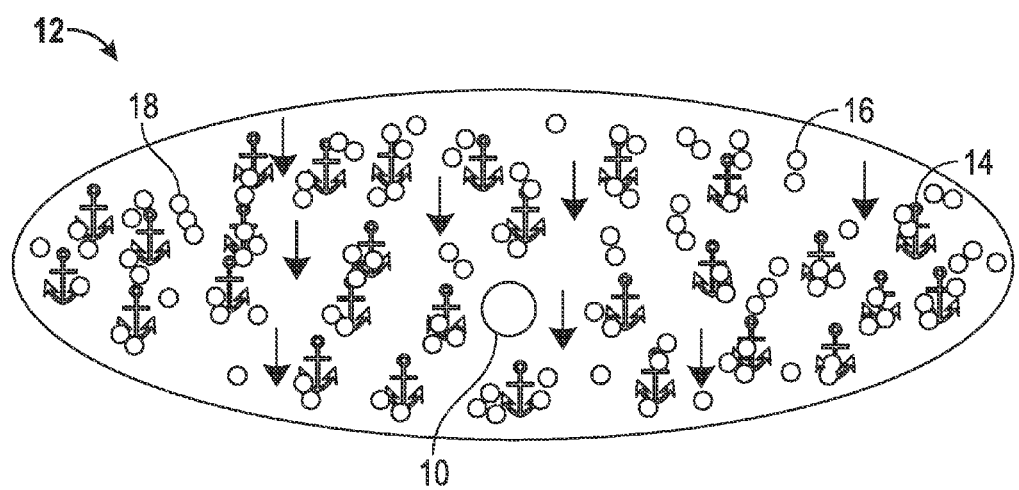
FIG. 2 is a schematic diagram of the proppant settling in the fracture of FIG. 1 prior to closure according to some embodiments of the current application.

Following the injection of the fracturing fluid, the well in some embodiments may be shut in or the pressure otherwise sufficiently maintained to keep the fracture 12 from closing. In some embodiments, the gravitational settling of proppant 16 as illustrated in FIG. 2 may be initiated, e.g., by activation of a trigger to destabilize the fracturing fluid, such as, for example, a breaker and optionally a breaker aid to reduce the viscosity of the fracturing fluid. Anchorants 14 may optionally also settle in the fracture 12, e.g., at a slower rate than the proppant 16, which may result in some embodiments from the anchorants 14 having a specific gravity that is equal to or closer to that of the carrier fluid than that of the proppant 16. As one non-limiting example, the proppant may be sand with a specific gravity of 2.65, the anchorants 14 may be a localized fiber-laden region comprising fiber with a specific gravity of 1.1-1.5, e.g., polylactic acid fibers having a specific gravity of 1.25, and the carrier fluid may be aqueous with a specific gravity of 1-1.1. In this example, the anchorants 14 may have a lower settling rate relative to the proppant 16. In other embodiments, the anchorants 14 may interact with either or both of the fracture faces, e.g. by friction or adhesion, and may have a density similar or dissimilar to that of the proppant, e.g., glass fibers may have a specific gravity greater than 2.

Figure 3:
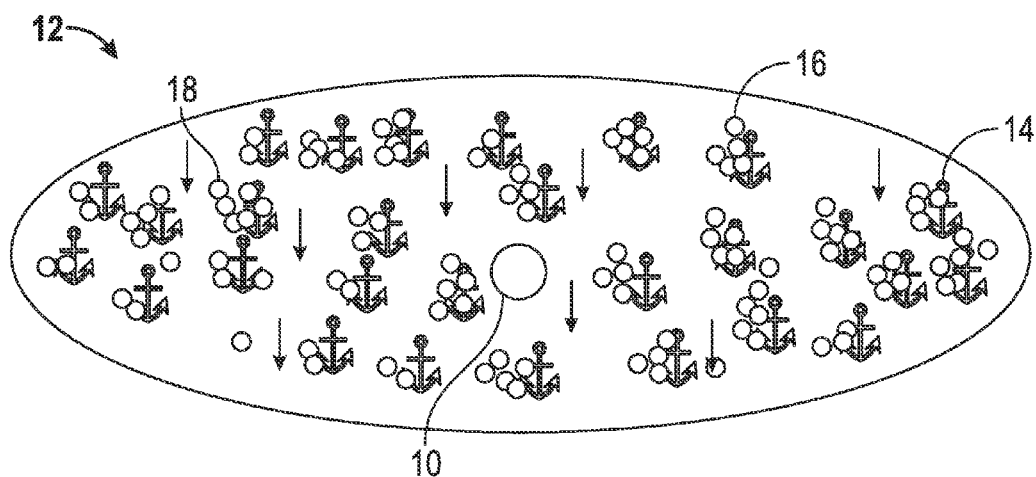
FIG. 3 is a schematic diagram showing growth of the clusters in the fracture of FIG. 2 according to some embodiments of the current application.
Figure 4:
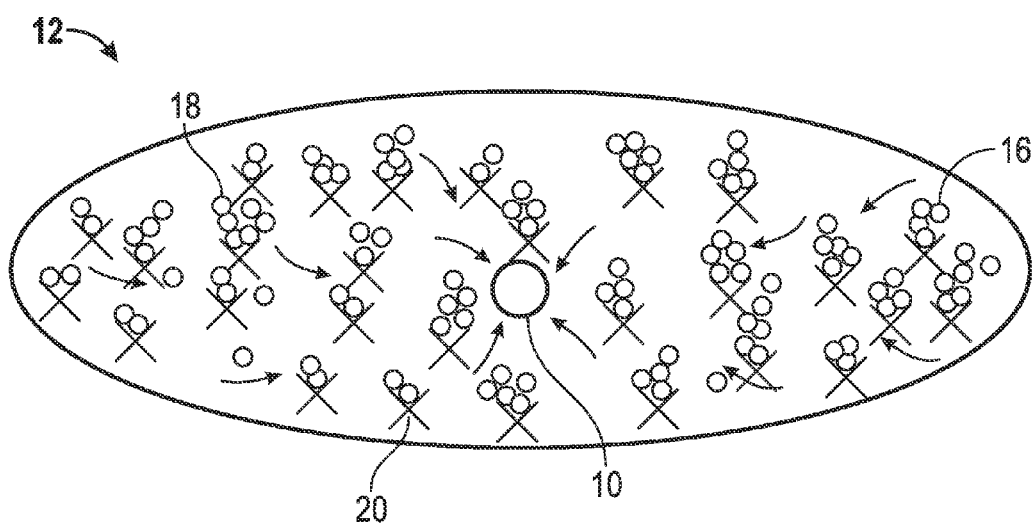
FIG. 4 is a schematic diagram of the clusters of FIG. 3 anchored in the fracture to maintain a system of interconnected hydraulically conductive channels for reservoir fluid production according to some embodiments of the current application.

As a result of differential settling rates according to some embodiments, the proppant 16 forms clusters 18 adjacent respective anchorants 14, and settling is retarded, as illustrated in FIG. 3. Finally, in some embodiments, the anchorants 14 are activated to immobilized anchoring structures 20 to hold the clusters 18 fast against the opposing surface(s) of the fracture 12, as illustrated in FIG. 4. The clusters 18 prop the fracture open to form hydraulically conductive channels 22 between the clusters 18 for the flow of reservoir fluids toward the wellbore during a production phase.

Figure 5:
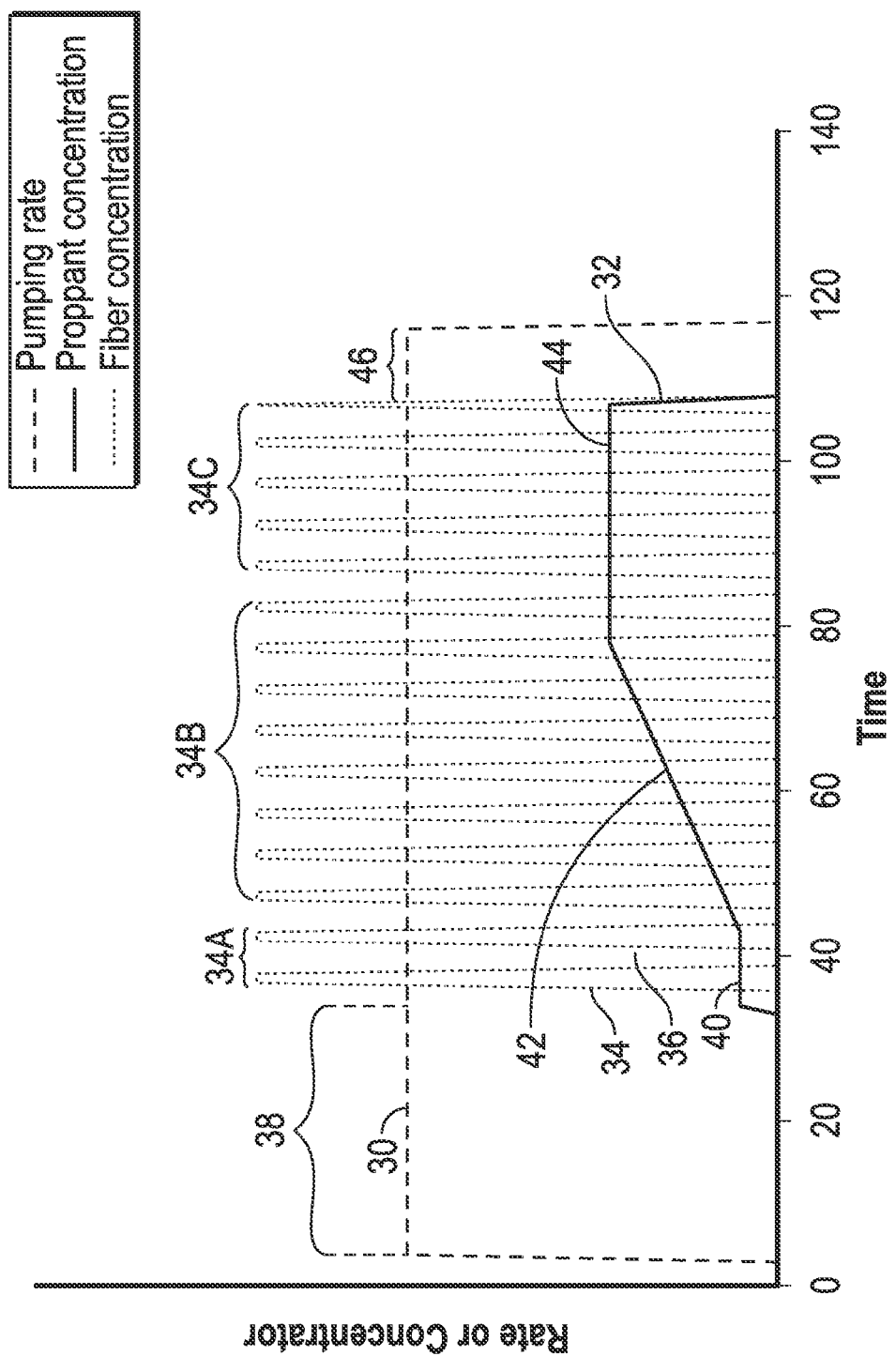
FIG. 5 shows a pumping sequence indicating pumping rate, proppant concentration and anchorant concentration for a formation fracturing treatment according to some embodiments of the current application.

As seen in FIG. 5, a pumping sequence used in some embodiments has a continuous pumping rate 30, a continuous proppant concentration 32 and a discontinuous fiber concentration 34, 36. In these embodiments, the proppant loading may follow a proppant-free pad stage 38 beginning at a relatively low proppant loading 40 which after one or more fiber-laden substages 34A, may have a smooth ramp 42 up over a series of fiber-laden substages 34B to a higher proppant loading 44, and then be maintained at a constant rate 44 for an additional series of fiber-laden substages 34C until the proppant stage 32 is ended, and followed by a flush stage 46.

For example, the weight of proppant added per unit volume of carrier fluid may be initially 0.048 g/mL (0.4 lbs proppant added per gallon of carrier fluid (ppa)) and ramped up to 0.48 g/mL (4 ppa) or 0.72 g/mL (6 ppa) or 1.4 g/mL (12 ppa). Concurrently, the fiber-free and fiber-laden substages 36, 34 are alternated, e.g., with the fiber free substages comprising no added fiber or <0.12 g/L and the fiber laden stages comprising 0.12-12 g/L (1-100 lbs/thousand gallons (ppt)) added fiber.

Figure 6:
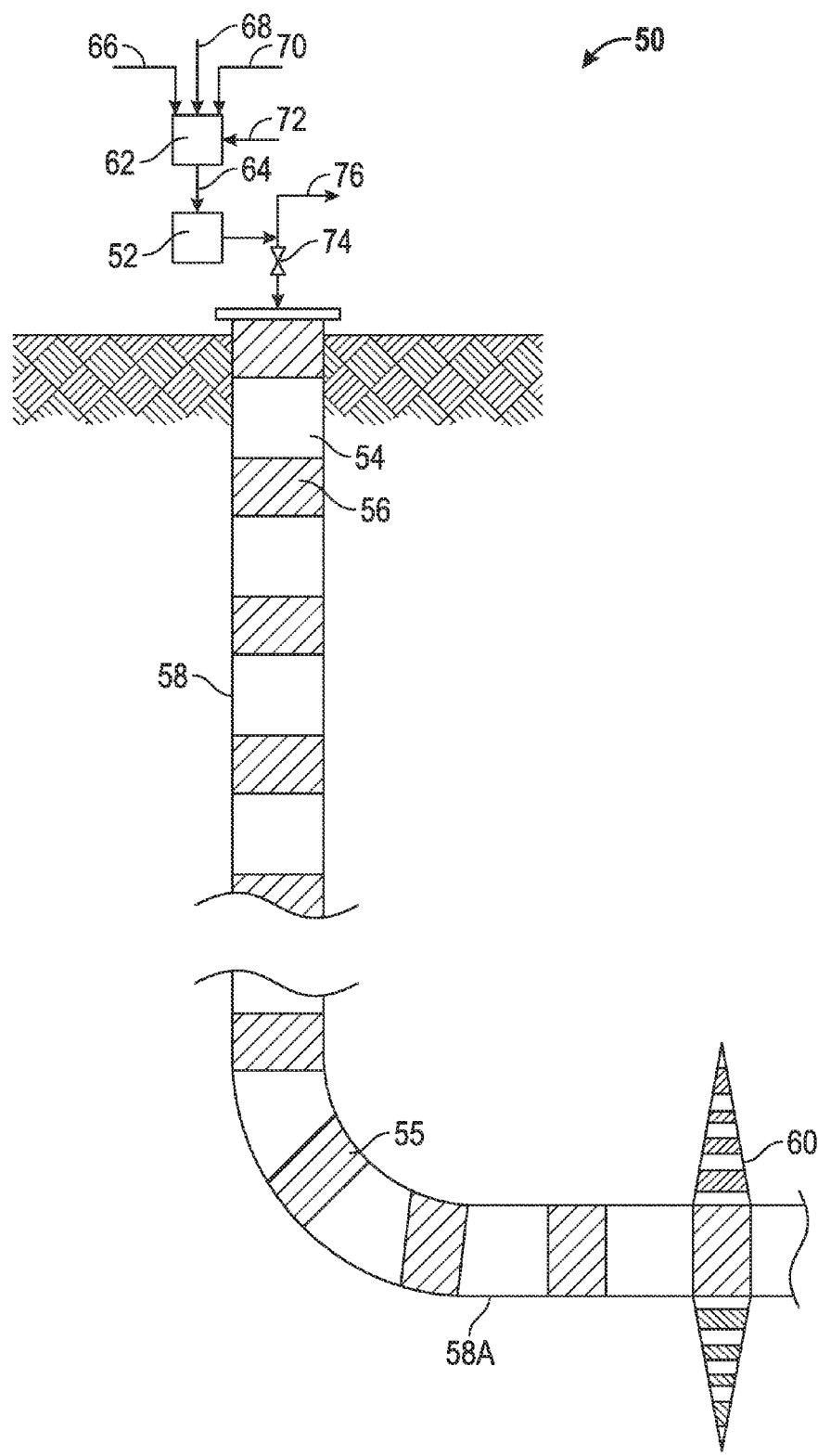
FIG. 6 schematically illustrates a formation fracturing system to implement the pumping sequence of FIG. 5 according to some embodiments of the current application.

With reference to FIG. 6, a system 50 used to implement the pumping sequence of FIG. 5 may include a pump system 52 comprising one or more pumps to supply the alternating fiber-free and fiber-laden, continuous-concentration proppant slurry slugs 54, 56 to the wellbore 58 and fracture 60. In embodiments as illustrated, the wellbore 58 may include a substantially horizontal portion 58A, which may be cased or completed open hole, wherein the fracture 60 is transversely or longitudinally oriented and thus generally vertical or sloped with respect to horizontal. A mixing station 62 in some embodiments may be provided at the surface to supply a mixture 64 of carrier fluid from source 66, any proppant from source 68, which may for example be an optionally stabilized concentrated blend slurry (CBS) to allow a continuous proppant concentration, any fiber from source 70, which may for example be a concentrated masterbatch to allow reliable alternation of fiber concentration, and any other additives which may be supplied with any of the sources 66, 68, 70 or an additional optional source(s) 72, in any order, such as, for example, viscosifiers, loss control agents, friction reducers, clay stabilizers, biocides, crosslinkers, breakers, breaker aids, corrosion inhibitors, and/or proppant flowback control additives, or the like. In some embodiments, concentrations of one or more additives, including other or additional anchorants and/or anchorant precursors, to the fracturing fluid may be alternated, e.g., in addition to alternating fiber concentration. For example breaker for the carrier fluid may be added only to fiber-lean fluid, or a higher breaker concentration may be added to fiber free fluid and a lower breaker concentration may be added to fiber-laden fluid. Two or more additives (including fiber) may also be alternated independently.

The well may if desired also be provided with a shut in valve 74 to maintain pressure in the wellbore 58 and fracture 60, flow-back/production line 76 to flow back or produce fluids either during or post-treatment, as well as any conventional wellhead equipment.

Maintaining a relatively smooth proppant concentration during pumping in some embodiments enables the stability of the slugs 54, 56 during the pumping sequence because of the relatively insignificant change in density between fiber-free and fiber-laden slugs, e.g., a density delta wherein the density of the fiber-laden slugs 56 is within +/−10% of the density of the preceding and following fiber-free slugs 54, or wherein the density of the fiber-laden slugs 56 is within +/−5% of the density of the preceding and following fiber-free slugs 54, or wherein the density of the fiber-laden slugs 56 is within +/−2% of the density of the preceding and following fiber-free slugs 54, or wherein the density of the fiber-laden slugs 56 is within +/−1% of the density of the preceding and following fiber-free slugs 54, or the like. The density difference between adjacent slugs 54, 56 is recognized as a main parameter influencing the rate of interface mixing between the slugs, particularly in some embodiments wherein the same carrier fluid is used and/or wherein the adjacent slugs 54, 56 have the same or similar apparent viscosity, i.e., wherein the adjacent slugs have viscosities within +/−10% of each other, e.g., +/−5% or +/−2% or +/−1%; wherein the density difference might otherwise impose a limit for minimal volume of slugs in the alternating-proppant loading technology disclosed in U.S. Patent Application Publication No. US 2008/0135242, which is hereby incorporated herein by reference. In some embodiments, the fiber concentration between the adjacent slugs 54, 56 may be an alternating step function of 0 or essentially zero (fiber-free) or less than 1 g/L (1 ppt) in the slugs 54 and equal to or at least 1.2 g/L (10 ppt), or equal to or at least 2.4 g/L (20 ppt), or equal to or at least 4.8 g/L (40 ppt), in the fiber-laden slugs 56.

The concept according to some embodiments herein can thus minimize interface mixing which may enable better stability at smaller slug size, which may in turn provide deeper slug transportation inside the fracture 60 away from the wellbore 58, which in turn, can provide better channelization. In some embodiments the slugs 54, 56 may have a volume of less than or equal to 1600 L (10 bbls), 1300 L (8 bbls), 950 L (6 bbls), 640 L (4 bbls), 320 L (2 bbls), 160 L (1 bbl) or 80 L (0.5 bbls); and/or a frequency of slugs 54, 56 in the wellbore of from at least 10 per hour, or from at least 20 per hour, or from at least 30 per hour, and up to 100 per hour or less or up to 50 per hour or less, and/or a slug space velocity for wellbore transit (pumping rate/slug volume) of at least 1/min or at least 5/min or at least 10/min up to 100/min or more. In some embodiments it is further contemplated that the slug volume and/or slug frequency may change during a treatment fluid stage, e.g., starting with a higher slug volume and/or lower frequency and ending with a lower slug volume and/or higher frequency, with either gradual slug volume/frequency changes between slugs or as a step function or series of step functions.

In some embodiments, the slugs 54, 56 may have the same or different volumes, e.g., the anchorant-free slugs 54 may have a larger volume than the anchorant laden slugs 56, including some embodiments wherein the anchorant comprise fiber. In some embodiments, the volumetric ratio of the anchorant-free slugs 54 to the anchorant-laden slugs 56, including some embodiments wherein the anchorant comprise fiber, may range from 1:100 to 100:1, or from any lower limit selected from 1:1, 2:1, 3:1, 4:1, 5:1, 6:1, 8:1, 10:1, 20:1, 50:1 up to any higher limit selected from 100:1, 75:1, 25:1, 15:1, 10:1, 8:1, 6:1, 4:1, 3:1, 2:1.

With reference to FIGS. 6 and 7, using the pumping sequence of FIG. 5 in some embodiments (particularly when the perforation slots are transverse) may result in a continuous introduction via the wellbore 110 to form a radial arrangement of a proppant free region 114 corresponding to the pad stage adjacent to a tip of the fracture 112, and a proppant laden region adjacent the wellbore 110 with alternating areas without fiber 116 and with fiber 118. The fiber-containing areas 116 and fiber-free areas 118 initially form in the fracture 112 as rings upon exit of the fracturing fluid from the wellbore 110, which rings thin as they progress radially away from the wellbore and break into separated areas, resulting in a proppant placement with the heterogeneous distribution of fiber containing and fiber-free regions 116, 118 inside the fracture.

In some embodiments, the ability of the fracturing fluid to suspend the proppant is reduced after finishing the fracturing treatment and before fracture closure to a level which triggers gravitational settling of the propping agent inside the fracture. For example, the fracturing fluid may be stabilized during placement with a viscosified carrier fluid and destabilized by breaking the viscosity after placement in the fracture and before closure. Proppant settling results in the creation of heterogeneity of proppant distribution inside the fracture because the rate of proppant settling in presence of fiber is significantly slower than without fiber. At some certain concentrations of fiber and propping agent according to embodiments herein, it is possible to enable the creation of stable interconnected proppant free areas and proppant rich clusters which in turn enables high conductivity of the fracture after its closure. As illustrated in FIGS. 8 and 9, proppant settling from the initial fiber distribution shown FIGS. 6-7 results in the formation of solids-rich clusters 120 over fiber rich structures 122 and of solids lean areas 124 corresponding to conductive channels.

As used herein, the terms "treatment fluid" or "wellbore treatment fluid" are inclusive of "fracturing fluid" or "treatment slurry" and should be understood broadly. These may be or include a liquid, a solid, a gas, and combinations thereof, as will be appreciated by those skilled in the art. A treatment fluid may take the form of a solution, an emulsion, an energized fluid (including foam), slurry, or any other form as will be appreciated by those skilled in the art.

As used herein, "slurry" refers to an optionally flowable mixture of particles dispersed in a fluid carrier. The terms "flowable" or "pumpable" or "mixable" are used interchangeably herein and refer to a fluid or slurry that has either a yield stress or low-shear (5.11 s$^{-1}$) viscosity less than 1000 Pa and a dynamic apparent viscosity of less than 10 Pa-s (10,000 cP) at a shear rate 170 s$^{-1}$, where yield stress, low-shear viscosity and dynamic apparent viscosity are measured at a temperature of 25° C. unless another temperature is specified explicitly or in context of use.

"Viscosity" as used herein unless otherwise indicated refers to the apparent dynamic viscosity of a fluid at a temperature of 25° C. and shear rate of 170 s$^{-1}$.

"Treatment fluid" or "fluid" (in context) refers to the entire treatment fluid, including any proppant, subproppant particles, liquid, gas etc. "Whole fluid," "total fluid" and "base fluid" are used herein to refer to the fluid phase plus any subproppant particles dispersed therein, but exclusive of proppant particles. "Carrier," "fluid phase" or "liquid phase" refer to the fluid or liquid that is present, which may comprise a continuous phase and optionally one or more discontinuous gas or liquid fluid phases dispersed in the continuous phase, including any solutes, thickeners or colloidal particles only, exclusive of other solid phase particles; reference to "water" in the slurry refers only to water and excludes any gas, liquid or solid particles, solutes, thickeners, colloidal particles, etc.; reference to "aqueous phase" refers to a carrier phase comprised predominantly of water, which may be a continuous or dispersed phase. As used herein the terms "liquid" or "liquid phase" encompasses both liquids per se and supercritical fluids, including any solutes dissolved therein.

The term "dispersion" means a mixture of one substance dispersed in another substance, and may include colloidal or non-colloidal systems. As used herein, "emulsion" generally means any system with one liquid phase dispersed in another immiscible liquid phase, and may apply to oil-in-water and water-in-oil emulsions. Invert emulsions refer to any water-in-oil emulsion in which oil is the continuous or external phase and water is the dispersed or internal phase.

The terms "energized fluid" and "foam" refer to a fluid which when subjected to a low pressure environment liberates or releases gas from solution or dispersion, for example, a liquid containing dissolved gases. Foams or energized fluids are stable mixtures of gases and liquids that form a two-phase system. Foam and energized fluids are generally described by their foam quality, i.e. the ratio of gas volume to the foam volume (fluid phase of the treatment fluid), i.e., the ratio of the gas volume to the sum of the gas plus liquid volumes). If the foam quality is between 52% and 95%, the energized fluid is usually called foam. Above 95%, foam is generally changed to mist. In the present patent application, the term "energized fluid" also encompasses foams and refers to any stable mixture of gas and liquid, regardless of the foam quality. Energized fluids comprise any of:

(a) Liquids that at bottom hole conditions of pressure and temperature are close to saturation with a species of gas. For example the liquid can be aqueous and the gas nitrogen or carbon dioxide. Associated with the liquid and gas species and temperature is a pressure called the bubble point, at which the liquid is fully saturated. At pressures below the bubble point, gas emerges from solution;

(b) Foams, consisting generally of a gas phase, an aqueous phase and a solid phase. At high pressures the foam quality is typically low (i.e., the non-saturated gas volume is low), but quality (and volume) rises as the pressure falls. Additionally, the aqueous phase may have originated as a solid material and once the gas phase is dissolved into the solid phase, the viscosity of solid material is decreased such that the solid material becomes a liquid; or (c) Liquefied gases.

As used herein unless otherwise specified, as described in further detail herein, particle size and particle size distribution (PSD) mode refer to the median volume averaged size. The median size used herein may be any value understood in the art, including for example and without limitation a diameter of roughly spherical particulates. In an embodiment, the median size may be a characteristic dimension, which may be a dimension considered most descriptive of the particles for specifying a size distribution range.

As used herein, a "water soluble polymer" refers to a polymer which has a water solubility of at least 5 wt % (0.5 g polymer in 9.5 g water) at 25° C.

The measurement or determination of the viscosity of the liquid phase (as opposed to the treatment fluid or base fluid) may be based on a direct measurement of the solids-free liquid, or a calculation or correlation based on a measurement(s) of the characteristics or properties of the liquid containing the solids, or a measurement of the solids-containing liquid using a technique where the determination of viscosity is not affected by the presence of the solids. As used herein, solids-free for the purposes of determining the viscosity of the liquid phase means in the absence of non-colloidal particles larger than 1 micron such that the particles do not affect the viscosity determination, but in the presence of any submicron or colloidal particles that may be present to thicken and/or form a gel with the liquid, i.e., in the presence of ultrafine particles that can function as a thickening agent. In some embodiments, a "low viscosity liquid phase" means a viscosity less than about 300 mPa-s measured without any solids greater than 1 micron at 170 s$^{-1}$ and 25° C.

In some embodiments, the treatment fluid may include a continuous fluid phase, also referred to as an external phase, and a discontinuous phase(s), also referred to as an internal phase(s), which may be a fluid (liquid or gas) in the case of an emulsion, foam or energized fluid, or which may be a solid in the case of a slurry. The continuous fluid phase, also referred to herein as the carrier fluid or comprising the carrier fluid, may be any matter that is substantially continuous under a given condition. Examples of the continuous fluid phase include, but are not limited to, water, hydrocarbon, gas (e.g., nitrogen or methane), liquefied gas (e.g., propane, butane, or the like), etc., which may include solutes, e.g. the fluid phase may be a brine, and/or may include a brine or other solution(s). In some embodiments, the fluid phase(s) may optionally include a viscosifying and/or yield point agent and/or a portion of the total amount of viscosifying and/or yield point agent present. Some non-limiting examples of the fluid phase(s) include hydratable gels and mixtures of hydratable gels (e.g. gels containing polysaccharides such as guars and their derivatives, xanthan and diutan and their derivatives, hydratable cellulose derivatives such as hydroxyethylcellulose, carboxymethylcellulose and others, polyvinyl alcohol and its derivatives, other hydratable polymers, colloids, etc.), a crosslinked hydratable gel, a viscosified acid (e.g. gel-based), an emulsified acid (e.g. oil outer phase), an energized fluid (e.g., an $N_2$ or $CO_2$ based foam), a viscoelastic surfactant (VES) viscosified fluid, and an oil-based fluid including a gelled, foamed, or otherwise viscosified oil.

The discontinuous phase if present in the treatment fluid may be any particles (including fluid droplets) that are suspended or otherwise dispersed in the continuous phase in a disjointed manner. In this respect, the discontinuous phase can also be referred to, collectively, as "particle" or "particulate" which may be used interchangeably. As used herein, the term "particle" should be construed broadly. For example, in some embodiments, the particle(s) of the current application are solid such as proppant, sands, ceramics, crystals, salts, etc.; however, in some other embodiments, the particle(s) can be liquid, gas, foam, emulsified droplets, etc. Moreover, in some embodiments, the particle(s) of the current application are substantially stable and do not change shape or form over an extended period of time, temperature, or pressure; in some other embodiments, the particle(s) of the current application are degradable, expandable, swellable, dissolvable, deformable, meltable, sublimeable, or otherwise capable of being changed in shape, state, or structure.

In an embodiment, the particle(s) is substantially round and spherical. In an embodiment, the particle(s) is not substantially spherical and/or round, e.g., it can have varying degrees of sphericity and roundness, according to the API RP-60 sphericity and roundness index. For example, the particle(s) used as anchorants or otherwise may have an aspect ratio of more than 2, 3, 4, 5 or 6. Examples of such non-spherical particles include, but are not limited to, fibers, flocs, flakes, discs, rods, stars, etc. All such variations should be considered within the scope of the current application.

Introducing high-aspect ratio particles into the treatment fluid, e.g., particles having an aspect ratio of at least 6, represents additional or alternative embodiments for stabilizing the treatment fluid and inhibiting settling during proppant placement, which can be removed, for example by dissolution or degradation into soluble degradation products. Examples of such non-spherical particles include, but are not limited to, fibers, flocs, flakes, discs, rods, stars, etc., as described in, for example, U.S. Pat. No. 7,275,596, US20080196896, which are hereby incorporated herein by reference. In an embodiment, introducing ciliated or coated proppant into the treatment fluid may also stabilize or help stabilize the treatment fluid or regions thereof. Proppant or other particles coated with a hydrophilic polymer can make the particles behave like larger particles and/or more tacky particles in an aqueous medium. The hydrophilic coating on a molecular scale may resemble ciliates, i.e., proppant particles to which hairlike projections have been attached to or formed on the surfaces thereof. Herein, hydrophilically coated proppant particles are referred to as "ciliated or coated proppant." Hydrophilically coated proppants and methods of producing them are described, for example, in WO 2011-050046, U.S. Pat. Nos. 5,905,468,8,227,026 and 8,234,072, which are hereby incorporated herein by reference.

In an embodiment, the particles may be multimodal. As used herein multimodal refers to a plurality of particle sizes or modes which each has a distinct size or particle size distribution, e.g., proppant and fines. As used herein, the terms distinct particle sizes, distinct particle size distribution, or multi-modes or multimodal, mean that each of the plurality of particles has a unique volume-averaged particle size distribution (PSD) mode. That is, statistically, the particle size distributions of different particles appear as distinct peaks (or "modes") in a continuous probability distribution function. For example, a mixture of two particles having normal distribution of particle sizes with similar variability is considered a bimodal particle mixture if their respective means differ by more than the sum of their respective standard deviations, and/or if their respective means differ by a statistically significant amount. In an embodiment, the particles contain a bimodal mixture of two particles; in an embodiment, the particles contain a trimodal mixture of three particles; in an embodiment, the particles contain a tetramodal mixture of four particles; in an embodiment, the particles contain a pentamodal mixture of five particles, and so on. Representative references disclosing multimodal particle mixtures include U.S. Pat. Nos. 5,518, 996, 7,784,541, 7,789,146, 8,008,234, 8,119,574, 8,210,249, US 2010/0300688, US 2012/0000641, US 2012/0138296, US 2012/0132421, US 2012/0111563, WO 2012/054456, US 2012/0305245, US 2012/0305254, US 2012/0132421, PCT/RU2011/000971 and U.S. Ser. No. 13/415,025, each of which are hereby incorporated herein by reference.

"Solids" and "solids volume" refer to all solids present in the slurry, including proppant and subproppant particles, including particulate thickeners such as colloids and submicron particles. "Solids-free" and similar terms generally exclude proppant and subproppant particles, except particulate thickeners such as colloids for the purposes of determining the viscosity of a "solids-free" fluid.

"Proppant" refers to particulates that are used in well work-overs and treatments, such as hydraulic fracturing operations, to hold fractures open following the treatment. In some embodiments, the proppant may be of a particle size mode or modes in the slurry having a weight average mean particle size greater than or equal to about 100 microns, e.g., 140 mesh particles correspond to a size of 105 microns. In further embodiments, the proppant may comprise particles or aggregates made from particles with size from 0.001 to 1 mm. All individual values from 0.001 to 1 mm are disclosed and included herein. For example, the solid particulate size may be from a lower limit of 0.001, 0.01, 0.1 or 0.9 mm to an upper limit of 0.009, 0.07, 0.5 or 1 mm. Here particle size is defined is the largest dimension of the grain of said particle.

"Gravel" refers to particles used in gravel packing, and the term is synonymous with proppant as used herein. "Sub-proppant" or "subproppant" refers to particles or particle size or mode (including colloidal and submicron particles) having a smaller size than the proppant mode(s); references to "proppant" exclude subproppant particles and vice versa. In an embodiment, the sub-proppant mode or modes each have a weight average mean particle size less than or equal to about one-half of the weight average mean particle size of a smallest one of the proppant modes, e.g., a suspensive/stabilizing mode.

The proppant, when present, can be naturally occurring materials, such as sand grains. The proppant, when present, can also be man-made or specially engineered, such as coated (including resin-coated) sand, modulus of various nuts, high-strength ceramic materials like sintered bauxite, etc. In some embodiments, the proppant of the current application, when present, has a density greater than 2.45 g/mL, e.g., 2.5-2.8 g/mL, such as sand, ceramic, sintered bauxite or resin coated proppant. In some embodiments, the proppant of the current application, when present, has a density greater than or equal to 2.8 g/mL, and/or the treatment fluid may comprise an apparent specific gravity less than 1.5, less than 1.4, less than 1.3, less than 1.2, less than 1.1, or less than 1.05, less than 1, or less than 0.95, for example. In some embodiments a relatively large density difference between the proppant and carrier fluid may enhance proppant settling during the clustering phase, for example.

In some embodiments, the proppant of the current application, when present, has a density less than or equal to 2.45 g/mL, such as light/ultralight proppant from various manufacturers, e.g., hollow proppant. In some embodiments, the treatment fluid comprises an apparent specific gravity greater than 1.3, greater than 1.4, greater than 1.5, greater than 1.6, greater than 1.7, greater than 1.8, greater than 1.9, greater than 2, greater than 2.1, greater than 2.2, greater than 2.3, greater than 2.4, greater than 2.5, greater than 2.6, greater than 2.7, greater than 2.8, greater than 2.9, or greater than 3. In some embodiments where the proppant may be buoyant, i.e., having a specific gravity less than that of the carrier fluid, the term "settling" shall also be inclusive of upward settling or floating.

"Stable" or "stabilized" or similar terms refer to a concentrated blend slurry (CBS) wherein gravitational settling of the particles is inhibited such that no or minimal free liquid is formed, and/or there is no or minimal rheological variation among strata at different depths in the CBS, and/or the slurry may generally be regarded as stable over the duration of expected CBS storage and use conditions, e.g., a CBS that passes a stability test or an equivalent thereof. In an embodiment, stability can be evaluated following different settling conditions, such as for example static under gravity alone, or dynamic under a vibratory influence, or dynamic-static conditions employing at least one dynamic settling condition followed and/or preceded by at least one static settling condition.

The static settling test conditions can include gravity settling for a specified period, e.g., 24 hours, 48 hours, 72 hours, or the like, which are generally referred to with the respective shorthand notation "24 h-static", "48 h-static" or "72 h static". Dynamic settling test conditions generally indicate the vibratory frequency and duration, e.g., 4 h@15 Hz (4 hours at 15 Hz), 8 h@5 Hz (8 hours at 5 Hz), or the like. Dynamic settling test conditions are at a vibratory amplitude of 1 mm vertical displacement unless otherwise indicated. Dynamic-static settling test conditions will indicate the settling history preceding analysis including the total duration of vibration and the final period of static conditions, e.g., 4 h@15 Hz/20 h-static refers to 4 hours vibration followed by 20 hours static, or 8 h@15 Hz/10 d-static refers to 8 hours total vibration, e.g., 4 hours vibration followed by 20 hours static followed by 4 hours vibration, followed by 10 days of static conditions. In the absence of a contrary indication, the designation "8 h@15 Hz/10 d-static" refers to the test conditions of 4 hours vibration, followed by 20 hours static followed by 4 hours vibration, followed by 10 days of static conditions. In the absence of specified settling conditions, the settling condition is 72 hours static. The stability settling and test conditions are at 25° C. unless otherwise specified.

As used herein, a concentrated blend slurry (CBS) may meet at least one of the following conditions:
(1) the slurry has a low-shear viscosity equal to or greater than 1 Pa-s (5.11 s$^{-1}$, 25° C.);
(2) the slurry has a Herschel-Bulkley (including Bingham plastic) yield stress (as determined in the manner described herein) equal to or greater than 1 Pa; or
(3) the largest particle mode in the slurry has a static settling rate less than 0.01 mm/hr; or
(4) the depth of any free fluid at the end of a 72-hour static settling test condition or an 8 h@15 Hz/10 d-static dynamic settling test condition (4 hours vibration followed by 20 hours static followed by 4 hours vibration followed finally by 10 days of static conditions) is no more than 2% of total depth; or
(5) the apparent dynamic viscosity (25° C., 170 s$^{-1}$) across column strata after the 72-hour static settling test condition or the 8 h@15 Hz/10 d-static dynamic settling test condition is no more than +/−20% of the initial dynamic viscosity; or
(6) the slurry solids volume fraction (SVF) across the column strata below any free water layer after the 72-hour static settling test condition or the 8 h@15 Hz/10 d-static dynamic settling test condition is no more than 5% greater than the initial SVF; or
(7) the density across the column strata below any free water layer after the 72-hour static settling test condition or the 8 h@15 Hz/10 d-static dynamic settling test condition is no more than 1% of the initial density.

In some embodiments, the concentrated blend slurry comprises at least one of the following stability indicia: (1) an SVF of at least 0.4 up to SVF=PVF; (2) a low-shear viscosity of at least 1 Pa-s (5.11 s$^{-1}$, 25° C.); (3) a yield stress (as determined herein) of at least 1 Pa; (4) an apparent viscosity of at least 50 mPa-s (170 s$^{-1}$, 25° C.); (5) a multimodal solids phase; (6) a solids phase having a PVF greater than 0.7; (7) a viscosifier selected from viscoelastic surfactants, in an amount ranging from 0.01 up to 7.2 g/L (60 ppt), and hydratable gelling agents in an amount ranging from 0.01 up to 4.8 g/L (40 ppt) based on the volume of fluid phase; (8) colloidal particles; (9) a particle-fluid density delta less than 1.6 g/mL, (e.g., particles having a specific gravity less than 2.65 g/mL, carrier fluid having a density greater than 1.05 g/mL or a combination thereof); (10) particles having an aspect ratio of at least 6; (11) ciliated or coated proppant; and (12) combinations thereof.

In an embodiment, the concentrated blend slurry is formed (stabilized) by at least one of the following slurry stabilization operations: (1) introducing sufficient particles into the slurry or treatment fluid to increase the SVF of the treatment fluid to at least 0.4; (2) increasing a low-shear viscosity of the slurry or treatment fluid to at least 1 Pa-s (5.11 s$^{-1}$, 25° C.); (3) increasing a yield stress of the slurry or treatment fluid to at least 1 Pa; (4) increasing apparent viscosity of the slurry or treatment fluid to at least 50 mPa-s (170 s$^{-1}$, 25° C.); (5) introducing a multimodal solids phase into the slurry or treatment fluid; (6) introducing a solids phase having a PVF greater than 0.7 into the slurry or treatment fluid; (7) introducing into the slurry or treatment fluid a viscosifier selected from viscoelastic surfactants, e.g., in an amount ranging from 0.01 up to 7.2 g/L (60 ppt), and hydratable gelling agents, e.g., in an amount ranging from 0.01 up to 4.8 g/L (40 ppt) based on the volume of fluid phase; (8) introducing colloidal particles into the slurry or treatment fluid; (9) reducing a particle-fluid density delta to less than 1.6 g/mL (e.g., introducing particles having a specific gravity less than 2.65 g/mL, carrier fluid having a density greater than 1.05 g/mL or a combination thereof); (10) introducing particles into the slurry or treatment fluid having an aspect ratio of at least 6; (11) introducing ciliated or coated proppant into slurry or treatment fluid; and (12) combinations thereof. The slurry stabilization operations may be separate or concurrent, e.g., introducing a single viscosifier may also increase low-shear viscosity, yield stress, apparent viscosity, etc., or alternatively or additionally with respect to a viscosifier, separate agents may be added to increase low-shear viscosity, yield stress and/or apparent viscosity.

Increasing carrier fluid viscosity in a Newtonian fluid also proportionally increases the resistance of the carrier fluid motion. In some embodiments, the carrier fluid has a lower limit of apparent dynamic viscosity, determined at 170 s$^{-1}$ and 25° C., of at least about 10 mPa-s, or at least about 25 mPa-s, or at least about 50 mPa-s, or at least about 75 mPa-s, or at least about 100 mPa-s, or at least about 150 mPa-s, or at least about 300 mPa-s, or at least about 500 mPa-s. A disadvantage of increasing the viscosity is that as the viscosity increases, the friction pressure for pumping the slurry generally increases as well. In some embodiments, the fluid carrier has an upper limit of apparent dynamic viscosity, determined at 170 s$^{-1}$ and 25° C., of less than about 1000 mPa-s, or less than about 500 mPa-s, or less than about 300 mPa-s, or less than about 150 mPa-s, or less than about 100 mPa-s, or less than about 50 mPa-s. In an embodiment, the fluid phase viscosity ranges from any lower limit to any higher upper limit.

In some embodiments, an agent may both viscosify and impart yield stress characteristics, and in further embodiments may also function as a friction reducer to reduce friction pressure losses in pumping the treatment fluid. In an embodiment, the liquid phase is essentially free of viscosifier or comprises a viscosifier in an amount ranging from 0.01 up to 12 g/L (0.08-100 ppt) of the fluid phase. The viscosifier can be a viscoelastic surfactant (VES) or a hydratable gelling agent such as a polysaccharide, which may be crosslinked. When using viscosifiers and/or yield stress fluids, proppant settling in some embodiments may be triggered by breaking the fluid using a breaker(s). In some embodiments, the slurry is stabilized for storage and/or pumping or other use at the surface conditions and proppant transport and placement, and settlement triggering is achieved downhole at a later time prior to fracture closure, which may be at a higher temperature, e.g., for some formations, the temperature difference between surface and downhole can be significant and useful for triggering degradation of the viscosifier, any stabilizing particles (e.g., subproppant particles) if present, a yield stress agent or characteristic, and/or a activation of a breaker. Thus in some embodiments, breakers that are either temperature sensitive or time sensitive, either through delayed action breakers or delay in mixing the breaker into the slurry to initiate destabilization of the slurry and/or proppant settling, can be useful.

In embodiments, the fluid may include leakoff control agents, such as, for example, latex dispersions, water soluble polymers, submicron particulates, particulates with an aspect ratio higher than 1, or higher than 6, combinations thereof and the like, such as, for example, crosslinked polyvinyl alcohol microgel. The fluid loss agent can be, for example, a latex dispersion of polyvinylidene chloride, polyvinyl acetate, polystyrene-co-butadiene; a water soluble polymer such as hydroxyethylcellulose (HEC), guar, copolymers of polyacrylamide and their derivatives; particulate fluid loss control agents in the size range of 30 nm to 1 micron, such as γ-alumina, colloidal silica, CaCO3, SiO2, bentonite etc.; particulates with different shapes such as glass fibers, flocs, flakes, films; and any combination thereof or the like. Fluid loss agents can if desired also include or be used in combination with acrylamido-methyl-propane sulfonate polymer (AMPS). In an embodiment, the leak-off control agent comprises a reactive solid, e.g., a hydrolyzable material such as PGA, PLA or the like; or it can include a soluble or solubilizable material such as a wax, an oil-soluble resin, or another material soluble in hydrocarbons, or calcium carbonate or another material soluble at low pH; and so on. In an embodiment, the leak-off control agent comprises a reactive solid selected from ground quartz, oil soluble resin, degradable rock salt, clay, zeolite or the like. In other embodiments, the leak-off control agent comprises one or more of magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and sodium calcium magnesium polyphosphate glass, or the like. The treatment fluid may also contain colloidal particles, such as, for example, colloidal silica, which may function as a loss control agent, gellant and/or thickener.

In embodiments, the proppant-containing treatment fluid may comprise from 0.06 or 0.12 g of proppant per mL of treatment fluid (corresponding to 0.5 or 1 ppa) up to 1.2 or 1.8 g/mL (corresponding to 10 or 15 ppa). In some embodiments, the proppant-laden treatment fluid may have a relatively low proppant loading in earlier-injected fracturing fluid and a relatively higher proppant loading in later-injected fracturing fluid, which may correspond to a relatively narrower fracture width adjacent a tip of the fracture and a relatively wider fracture width adjacent the wellbore. For example, the proppant loading may initially begin at 0.48 g/mL (4 ppa) and be ramped up to 0.6 g/mL (6 ppa) at the end.

Accordingly, the present invention provides the following embodiments:

E1. A method for treating a subterranean formation penetrated by a wellbore, comprising:
   injecting a treatment stage fluid above a fracturing pressure to form a fracture in the formation;
   continuously distributing a first solid particulate into the formation in the treatment stage fluid;
   aggregating the first solid particulate distributed into the fracture to form spaced-apart clusters in the fracture;
   anchoring at least some of the clusters in the fracture to inhibit aggregation of the at least some of the clusters;
   reducing pressure in the fracture to prop the fracture open on the clusters and form interconnected, hydraulically conductive channels between the clusters.

E2. The method according to embodiment E1, wherein the first solid particulate continuously distributed in the treatment stage fluid comprises disaggregated proppant at a continuous concentration.

E3. The method according to embodiment E1 or embodiment E2, wherein the aggregation comprises triggering settling of the distributed first solid particulate.

E4. The method according to embodiment E3, further comprising viscosifying the treatment stage fluid for distributing the first solid particulate into the formation, and breaking the treatment stage fluid in the fracture to trigger the settling.

E5. The method according to any one of embodiments E1 to E4, further comprising successively alternating concentration modes of an anchorant in the treatment stage fluid between a relatively anchorant-rich mode and an anchorant-lean mode during the continuous distribution of the first solid particulate into the formation in the treatment stage fluid to facilitate one or both of the cluster aggregation and anchoring.

E6. The method according to embodiment E5, wherein the anchorant comprises fiber.

E7. The method according to any one of embodiments E1 to E6, wherein the conductive channels extend in fluid communication from adjacent a face of the fracture in the formation away from the wellbore, to, or to near, the wellbore.

E8. The method according to any one of embodiments E1 to E7, comprising:
   injecting the treatment fluid stage into the fracture in the formation at a continuous rate with a continuous concentration of the first solid particulate;

while maintaining the continuous rate and first solid particle concentration during injection of the treatment fluid stage, successively alternating concentration modes of an anchorant in the treatment fluid stage between a plurality of relatively anchorant-rich modes and a plurality of anchorant-lean modes within the injected treatment fluid stage.

E9. The method according to embodiment E8, wherein the alternation of the concentration modes of the anchorant forms heterogeneous areas within the fracture comprising anchorant-rich areas and anchorant-lean areas.

E10. The method according to embodiment E8 or embodiment E9, further comprising forming bridges with the anchorant-rich modes in the fracture and forming conductive channels between the bridges with the anchorant-lean modes.

E11. The method according to any one of embodiments E1 to E10, wherein the injection of the treatment fluid stage forms a homogenous region within the fracture of continuously uniform distribution of the first solid particulate.

E12. The method according to any one of embodiments E1 to E11, wherein the injected treatment fluid stage comprises a viscosified carrier fluid, and further comprising:
reducing the viscosity of the carrier fluid in the fracture to induce settling of the first solid particulate prior to closure of the fracture; and
thereafter allowing the fracture to close.

E13. A method for treating a subterranean formation penetrated by a wellbore, comprising:
injecting into a fracture in the formation at a continuous rate a treatment fluid stage comprising a viscosified carrier fluid with a continuous first solid particulate concentration to form a homogenous region within the fracture of continuously uniform distribution of the first solid particulate;
successively alternating concentration modes of an anchorant in the treatment fluid between relatively anchorant-rich modes and relatively anchorant-lean modes within the injected treatment fluid stage, to form heterogeneous areas comprising anchorant-rich areas and anchorant-lean areas within the homogenous region of the continuously uniform distribution of the first solid particulate;
reducing the viscosity of the carrier fluid within the homogenous region to induce settling of the first solid particulate prior to closure of the fracture to form hydraulically conductive channels in at least the anchorant-lean areas and pillars in the anchorant-rich areas; and
thereafter allowing the fracture to close onto the pillars.

E14. The method according to embodiment E13, further comprising transforming the anchorant-rich areas into nodes rich in the first solid particulate to form the pillars.

E15. The method of according to embodiment E13 or embodiment E14, wherein the first solid particulate and the anchorant have different shapes, sizes, densities or a combination thereof.

E16. The method according to any one of embodiments E13 to E15, wherein the anchorant has an aspect ratio higher than 6.

E17. The method according to any one of embodiments E13 to E17, wherein the anchorant is a fiber, a floc, a flake, a ribbon, a platelet, a rod, or a combination thereof.

E18. The method of according to any one of embodiments E13 to E17, wherein the anchorant is a degradable material.

E19. The method according to any one of embodiments E13 to E18, wherein the anchorant is selected from the group consisting of polylactic acid (PLA), polyglycolic acid (PGA), polyethylene terephthalate (PET), polyester, polyamide, polycaprolactam and polylactone, poly(butylene Succinate, polydioxanonepolylactic acid, polyester, polycaprolactam, polyamide, polyglycolic acid, polyterephthalate, glass, ceramics, carbon (including carbon-based compounds), elements in metallic form, metal alloys, wool, basalt, acrylic, polyethylene, polypropylene, novoloid resin, polyphenylene sulfide, polyvinyl chloride, polyvinylidene chloride, polyurethane, polyvinyl alcohol, polybenzimidazole, polyhydroquinone-diimidazopyridine, poly(p-phenylene-2,6-benzobisoxazole), rayon, cotton, or other natural fibers, cellulose, wool, basalt, glass, rubber, sticky fiber, or a combination thereof.

E20. The method according to any one of embodiments E13 to E19, wherein the anchorant is an expandable material.

E21. The method according to any one of embodiments E13 to E20, wherein the treatment fluid stage is a proppant-laden hydraulic fracturing fluid and the solid first particulate is a proppant.

E22. A system, comprising:
a subterranean formation penetrated by a wellbore;
a treatment slurry stage disposed in the wellbore, the treatment slurry stage comprising a continuous first solid particulate concentration, and a plurality of relatively anchorant-rich substages disposed in the wellbore in an alternating sequence with a plurality of anchorant-lean substages; and
a pump system to continuously deliver the treatment fluid stage from the wellbore to the formation at a pressure above fracturing pressure to inject the treatment fluid stage into a fracture in the formation.

E23. The system according to embodiment E22, wherein the treatment fluid stage comprises a viscosified carrier fluid and a breaker to induce settling of the first solid particulate prior to closure of the fracture.

E24. The system according to embodiment E22 or E23, further comprising a treatment fluid supply unit to supply additional anchorant-rich and anchorant-lean substages of the treatment fluid stage to the wellbore.

E25. A system to treat a subterranean formation penetrated by a wellbore, comprising:
a pump system to deliver a treatment stage fluid through the wellbore to the formation above a fracturing pressure to form a fracture in the formation;
a treatment stage fluid supply unit to continuously distribute a first solid particulate into the treatment stage fluid, and to introduce an anchorant into the treatment stage fluid in successively alternating concentrations between a relatively anchorant-rich mode and an anchorant-lean mode, to form the treatment stage fluid having a continuous first solid particulate concentration and bimodal anchorant concentration;
a trigger in the treatment stage fluid to initiate aggregation of the first solid particulate in the fracture to form spaced-apart clusters in the fracture;
an anchoring system in the treatment fluid stage to anchor the clusters in the fracture and inhibit aggregation of the clusters;
a shut-in system to maintain and then reduce pressure in the fracture to prop the fracture open on the clusters and form interconnected, hydraulically conductive channels between the clusters.

E26. The system according to embodiment E25, wherein the treatment fluid stage comprises a viscosified carrier fluid and the trigger comprises a breaker.

E27. A system to treat a subterranean formation penetrated by a wellbore, comprising:
  means for injecting a treatment stage fluid above a fracturing pressure to form a fracture in the formation;
  means for continuously distributing a first solid particulate into the formation in the treatment stage fluid;
  means for aggregating the first solid particulate distributed into the fracture to form spaced-apart clusters in the fracture;
  means for anchoring the clusters in the fracture to inhibit aggregation of the clusters;
  means for reducing pressure in the fracture to prop the fracture open on the clusters and form interconnected, hydraulically conductive channels between the clusters.

EXAMPLES

Example 1

Figure 11:
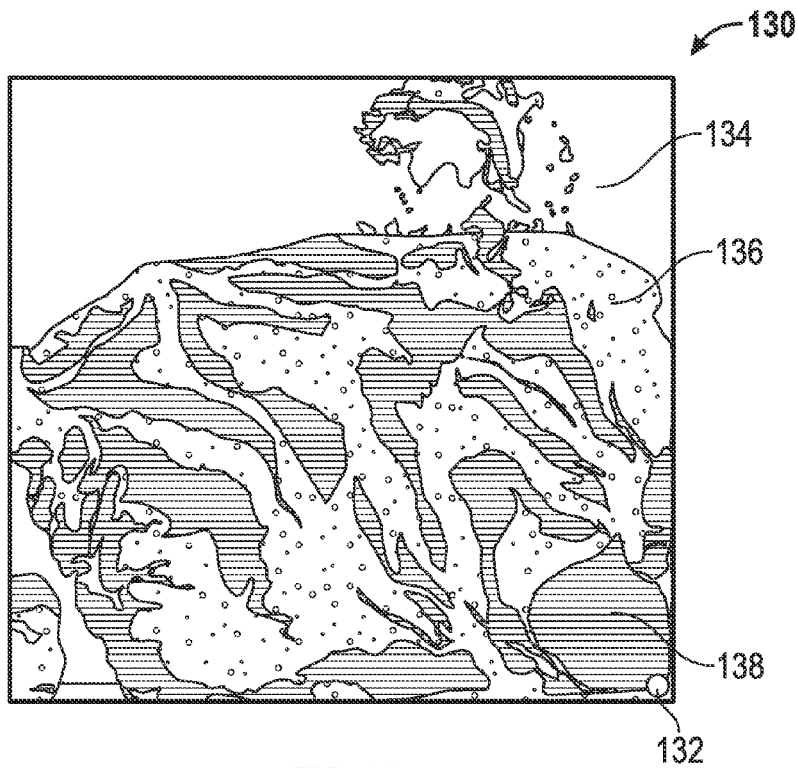
FIG. 11 schematically illustrates the formation of anchorant lean and anchorant rich regions after filling a slot with a sequence of slugs of fiber-free and fiber-laden viscosified treatment fluid as described in Example 1 according to some embodiments of the current application.

Creating channels and proppant clusters during proppant settling in laboratory slot filling test. In this example we describe results of the laboratory experiment on creating channels in slot 130 during proppant settling. In the experiment the slot with the initial width of 6 mm and internal dimensions of 102 cm by 102 cm (40"×40") was filled with alternated sequence of fiber-laden 138 and fiber-free proppant slugs 136 prepared with a crosslinked fluid 134 (see FIG. 11). The slot had transparent front plate 132. Black sandpaper with roughness of 100 mesh grit was glued to the back wall of the slot prior the experiment.

The volume of each slug was 0.8 L. In total 8 slugs of each type were pumped inside the slot in sequential manner. Two-thirds of the slot was filled because of significant wall deflection which resulted in increase in internal volume of the slot over the designed volume of fluid. Because of the deflection width in the middle of the slot during the filling increased from 6 mm to 10 mm. Composition of the slugs is given below.

Fiber free fluid: 0.48 g/mL (4 ppa) of sand (mixture of 85% of 40/70 mesh and 15% of 100 mesh) in crosslinked carrier fluid (3 g/L (25 ppt) viscosifier; 0.24 g/L (2 gpt) crosslinker, 1.2 g/L (10 ppt) breaker, 0.5 mL/L (0.5 gpt) breaker aid).

Fiber laden fluid: 0.48 g/mL (4 ppa) of sand (mixture of 85% of 40/70 mesh and 15% of 100 mesh) and 4.8 g/L (40 ppt) PLA fiber in crosslinked carrier fluid (3 g/L (25 ppt) viscosifier; 0.24 g/L (2 gpt) crosslinker, 1.2 g/L (10 ppt) breaker, 0.5 mL/L (0.5 gpt) breaker aid).

Sand in fiber laden fluid was painted blue by adding small amount of methylene blue. The breaker and breaker aid were added to each fluid type to reduce fluid viscosity with time for enabling proppant settling. The concentrations of breaker and breaker aid enabled complete breaking of the crosslinked fluid in 1 hour after start of the experiment at room temperature.

Figure 12:
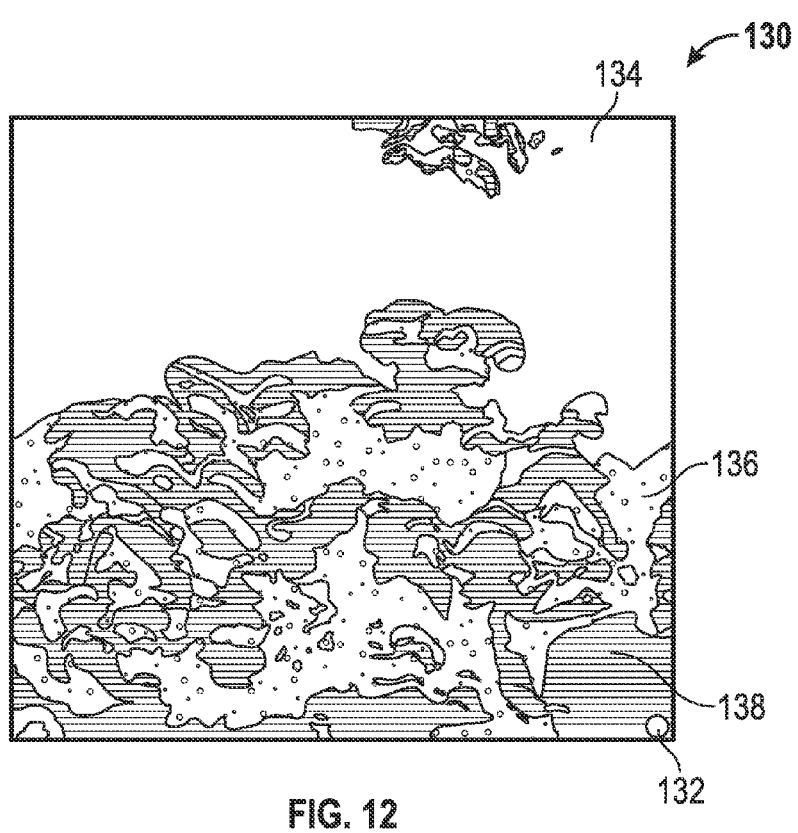
FIG. 12 schematically illustrates the slot of FIG. 11 1.5 hours following filling of the slot as described in Example 1 according to some embodiments of the current application.
Figure 13:
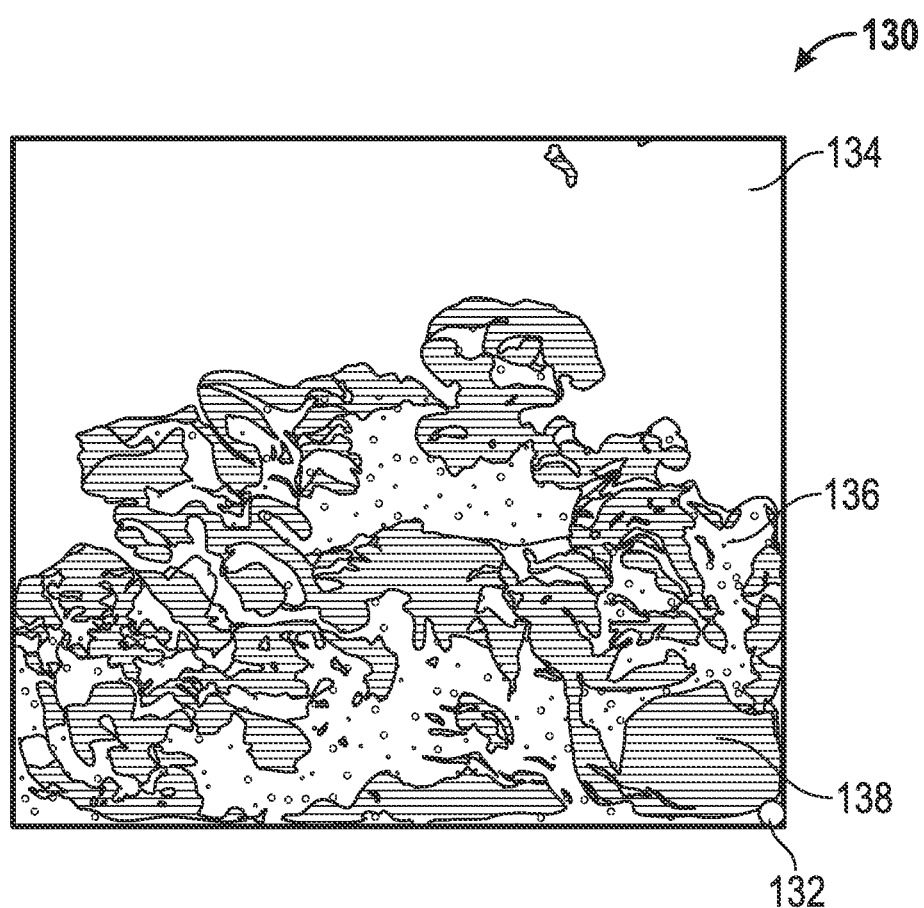
FIG. 13 schematically illustrates the slot of FIGS. 11-12 15 hours following filling of the slot as described in Example 1 according to some embodiments of the current application.

FIGS. 12 and 13 schematically show the slot 1.5 hours and 15 hours, respectively, after start of the experiment. It is clearly seen that breaking of crosslinked fluid 134 resulted in proppant settling in fiber-free areas 136 and its accumulation in slugs of fiber-laden fluid 138. The heterogeneous distribution of sand created inside the slot was stable for more than 10 hours.

Width of the created clusters was ~10 mm as it was defined during taking the slot apart after the experiment. Solid volume fraction inside of fiber free clusters was 56% and 48% within fiber laden areas.

While the embodiments have been illustrated and described in detail in the drawings and foregoing description, the same is to be considered as illustrative and not restrictive in character, it being understood that only some embodiments have been shown and described and that all changes and modifications that come within the spirit of the embodiments are desired to be protected. It should be understood that while the use of words such as ideally, desirably, preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

We claim:

1. A method for treating a subterranean formation penetrated by a wellbore, comprising:
  injecting a treatment stage fluid above a fracturing pressure to form a fracture in the formation, wherein the fluid comprises a continuous concentration of a first solid particulate and a discontinuous concentration of an anchorant;
  aggregating the first solid particulate distributed into the fracture to form spaced-apart clusters in the fracture;
  anchoring at least some of the clusters in the fracture to inhibit aggregation of the at least some of the clusters; and
  reducing pressure in the fracture to prop the fracture open on the clusters and form interconnected, hydraulically conductive channels between the clusters.

2. The method of claim 1 further comprising:
  successively alternating concentration of the anchorant in the treatment stage fluid between a relatively anchorant-rich mode and an anchorant-lean mode during the continuous distribution of the first solid particulate into the formation in the treatment stage fluid to facilitate one or both of the cluster aggregation and anchoring.

3. The method of claim 1, wherein the first solid particulate in the treatment stage fluid comprises disaggregated proppant at the continuous concentration.

4. The method of claim 1, wherein the aggregation comprises triggering settling of the first solid particulate.

5. The method of claim 4, further comprising viscosifying the treatment stage fluid for distributing the first solid particulate into the formation, and breaking the treatment stage fluid in the fracture to trigger the settling.

6. The method of claim 1, wherein the anchorant comprises fiber.

7. The method of claim 1, wherein the conductive channels extend in fluid communication from adjacent a face of the fracture in the formation away from the wellbore to or to near the wellbore.

8. A method for treating a subterranean formation penetrated by a wellbore, comprising:
  injecting into a fracture in the formation a first solid particulate at a continuous concentration;

while maintaining the continuous rate and first solid particulate concentration during injection of the treatment fluid stage, successively alternating concentrations of an anchorant in the treatment fluid stage between a plurality of relatively anchorant-rich modes and a plurality of anchorant-lean modes within the injected treatment fluid stage.

9. The method of claim 8, wherein the injection of the treatment fluid stage forms a homogenous region of the first solid particulate of uniform distribution within the fracture.

10. The method of claim 8, wherein the alternation of the concentration modes of the anchorant forms heterogeneous areas within the fracture comprising anchorant-rich areas and anchorant-lean areas.

11. The method of claim 8, wherein the injected treatment fluid stage comprises a viscosified carrier fluid, and further comprising:
reducing the viscosity of the carrier fluid in the fracture to induce settling of the first solid particulate prior to closure of the fracture; and
thereafter allowing the fracture to close.

12. The method of claim 8, further comprising forming bridges with the anchorant-rich modes in the fracture and forming conductive channels between the bridges with the anchorant-lean modes.

13. A method for treating a subterranean formation penetrated by a wellbore, comprising:
injecting into a fracture in the formation at a continuous rate a treatment fluid stage comprising a viscosified carrier fluid with a continuous concentration of a first solid particulate to form a homogenous region within the fracture of continuously uniform distribution of the first solid particulate;
successively alternating concentration modes of an anchorant in the treatment fluid between relatively anchorant-rich modes and relatively anchorant-lean modes within the injected treatment fluid stage, to form heterogeneous areas comprising anchorant-rich areas and anchorant-lean areas within the homogenous region of the continuously uniform distribution of the first solid particulate;
reducing the viscosity of the carrier fluid within the homogenous region to induce settling of the first solid particulate prior to closure of the fracture to form hydraulically conductive channels in at least the anchorant-lean areas and pillars in the anchorant-rich areas; and
thereafter allowing the fracture to close onto the pillars.

14. The method of claim 13, further comprising transforming the anchorant-rich areas into nodes rich in the first solid particulate to form the pillars.

15. The method of claim 13, wherein the first solid particulate and the anchorant have different shapes, sizes, densities or a combination thereof.

16. The method of claim 13, wherein the anchorant has an aspect ratio higher than 6.

17. The method of claim 13, wherein the anchorant is a fiber, a floc, a flake, a ribbon, a platelet, a rod, or a combination thereof.

18. The method of claim 13, wherein the anchorant is selected from the group consisting of glass, ceramics, carbon (including carbon-based compounds), elements in metallic form, metal alloys, wool, basalt, acrylic, polyethylene, polypropylene, novoloid resin, polyphenylene sulfide, polyvinyl chloride, polyvinylidene chloride, polyurethane, polyvinyl alcohol, polybenzimidazole, polyhydroquinone-diimidazopyridine, poly(p-phenylene-2,6-benzobisoxazole), rayon, cotton, or other natural fibers, cellulose, wool, basalt, glass, rubber, acrylic, mica, and combinations thereof.

19. The method of claim 13, wherein the anchorant is a sticky fiber.

20. The method of claim 13, wherein the anchorant is an expandable material.

21. The method of claim 13, wherein the treatment fluid stage is a proppant-laden hydraulic fracturing fluid and the first solid particulate is a proppant.

22. The method of claim 13, wherein the anchorant is a degradable material.

23. The method of claim 22, wherein the anchorant is selected from the group consisting of polylactic acid (PLA), polyglycolic acid (PGA), polyethylene terephthalate (PET), polyester, polyamide, polycaprolactam and polylactone, poly(butylene Succinate, polydioxanonepolylactic acid, polyester, polycaprolactam, polyamide, polyglycolic acid, polyterephthalate, or a combination thereof.

24. A system, comprising:
a subterranean formation penetrated by a wellbore;
a treatment fluid stage disposed in the wellbore, the treatment fluid stage comprising a continuous concentration of a first solid particulate and a discontinuous concentration of an anchorant; and
a pump system to continuously deliver the treatment fluid stage from the wellbore to the formation at a pressure above fracturing pressure to inject the treatment fluid stage into a fracture in the formation.

25. The system of claim 24, wherein the treatment fluid stage comprises a viscosified carrier fluid and a breaker to induce settling of the first solid particulate prior to closure of the fracture.

26. The system of claim 24, wherein the discontinuous concentration of the anchorant comprises a plurality of relatively anchorant-rich substages disposed in the wellbore in an alternating sequence with a plurality of anchorant-lean substages.

27. A system to treat a subterranean formation penetrated by a wellbore, comprising:
a pump system to deliver a treatment stage fluid through the wellbore to the formation above a fracturing pressure to form a fracture in the formation;
a treatment stage fluid supply unit to distribute a continuous concentration of a first solid particulate into the treatment stage fluid, and to introduce a discontinuous concentration of an anchorant to form the treatment stage fluid having a continuous concentration of a combined mixture of the first solid particulate and a bimodal anchorant;
a trigger in the treatment stage fluid to initiate aggregation of the first solid particulate in the fracture to form spaced-apart clusters in the fracture;
an anchoring system in the treatment fluid stage to anchor the clusters in the fracture and inhibit aggregation of the clusters;
a shut-in system to maintain and then reduce pressure in the fracture to prop the fracture open on the clusters and form interconnected, hydraulically conductive channels between the clusters.

28. The system of claim 27, wherein the treatment fluid stage comprises a viscosified carrier fluid and the trigger comprises a breaker.

29. A system to treat a subterranean formation penetrated by a wellbore, comprising:
means for injecting a treatment stage fluid above a fracturing pressure to form a fracture in the formation;

means for continuously distributing a continuous concentration of a first solid particulate and a discontinuous concentration of an anchorant in the treatment stage fluid;

means for aggregating the first solid particulate distributed into the fracture to form spaced-apart clusters in the fracture;

means for anchoring the clusters in the fracture to inhibit aggregation of the clusters;

means for reducing pressure in the fracture to prop the fracture open on the clusters and form interconnected, hydraulically conductive channels between the clusters, wherein the system further comprises means for alternating concentrations of an anchorant in the treatment stage fluid between a relatively anchorant-rich mode and an anchorant-lean mode during distribution of the continuous concentration of the first solid particulate to facilitate one or both of the cluster aggregation and anchoring.

* * * * *